United States Patent
Zhang et al.

(10) Patent No.: US 12,452,431 B2
(45) Date of Patent: Oct. 21, 2025

(54) MOTION ESTIMATION METHOD AND APPARATUS IN CODING PROCESS, DEVICE, STORAGE MEDIUM

(71) Applicant: Tencent Technology (Shenzhen) Company Limited, Guangdong (CN)

(72) Inventors: Hongbin Zhang, Shenzhen (CN); Wei Kuang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 92 days.

(21) Appl. No.: 18/502,235

(22) Filed: Nov. 6, 2023

(65) Prior Publication Data

US 2024/0073424 A1  Feb. 29, 2024

Related U.S. Application Data

(63) Continuation of application No. PCT/CN2022/135634, filed on Nov. 30, 2022.

(30) Foreign Application Priority Data

Jan. 28, 2022 (CN) .................. 202210105603.2

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/117* (2014.11);
(Continued)

(58) Field of Classification Search
CPC .................. H04N 19/137; H04N 19/172
See application file for complete search history.

(56) References Cited

U.S. PATENT DOCUMENTS 10,798,380 B1  10/2020  Seshadri et al.
12,244,817 B2 *  3/2025  Liu .................. H04N 19/105
(Continued)

FOREIGN PATENT DOCUMENTS

| CN | 102055977 A | 5/2011 |
|----|-------------|--------|
| CN | 106034236 A | 10/2016 |
| CN | 110839155 A | 2/2020 |

OTHER PUBLICATIONS

International Search Report for PCT/CN2022/135634 dated Feb. 22, 2023.
(Continued)

*Primary Examiner* — Irfan Habib
(74) *Attorney, Agent, or Firm* — Sughrue Mion, PLLC

(57) ABSTRACT

A motion estimation method in a coding process includes obtaining a video frame, determining a target code block from the video frame, obtaining reference motion information of an auxiliary code block of the target code block including motion information of N adjacent code blocks adjacent to the target code block, determining a target reference picture search range for the target code block from M reference picture lists based on picture search range information indicated by the reference motion information, and performing motion estimation on the target code block based on the target reference picture search range.

20 Claims, 5 Drawing Sheets

(51) Int. Cl.
*H04N 19/117* (2014.01)
*H04N 19/147* (2014.01)
*H04N 19/172* (2014.01)
*H04N 19/176* (2014.01)

(52) U.S. Cl.
CPC ......... *H04N 19/147* (2014.11); *H04N 19/172* (2014.11); *H04N 19/176* (2014.11)

(56) References Cited

U.S. PATENT DOCUMENTS

| | | | |
|---|---|---|---|
| 2011/0110429 A1* | 5/2011 | La | H04N 19/51 |
| | | | 375/E7.125 |
| 2013/0170549 A1 | 7/2013 | Li et al. | |
| 2016/0277756 A1* | 9/2016 | Shen | H04N 19/146 |
| 2021/0385461 A1* | 12/2021 | Liu | H04N 19/52 |
| 2022/0078407 A1* | 3/2022 | Zhao | H04N 19/176 |
| 2022/0109868 A1* | 4/2022 | Zhang | G06F 7/49978 |
| 2022/0124312 A1* | 4/2022 | Park | H04N 19/159 |
| 2022/0150473 A1* | 5/2022 | Park | H04N 19/52 |
| 2022/0295088 A1* | 9/2022 | Zhang | H04N 19/52 |
| 2023/0199171 A1* | 6/2023 | Hsiao | H04N 19/573 |
| | | | 375/240.02 |
| 2024/0056584 A1* | 2/2024 | Liu | H04N 19/105 |
| 2024/0146908 A1* | 5/2024 | Zhang | H04N 19/567 |
| 2024/0196002 A1* | 6/2024 | Deng | H04N 19/159 |
| 2024/0283944 A1* | 8/2024 | Deng | H04N 19/593 |
| 2025/0113053 A1* | 4/2025 | Chen | H04N 19/176 |

OTHER PUBLICATIONS

Written Opinion for PCT/CN2022/135634 dated Feb. 22, 2023.
Extended European Search Report dated Feb. 24, 2025 in Application No. 22923454.7.

* cited by examiner

MOTION ESTIMATION METHOD AND APPARATUS IN CODING PROCESS, DEVICE, STORAGE MEDIUM

CROSS-REFERENCE TO RELATED APPLICATIONS

This application is a continuation application of International Patent Application No. PCT/CN2022/135634 filed on Nov. 30, 2022, which claims priority to Chinese Patent Application No. 202210105603.2 filed on Jan. 28, 2022, which are incorporated by reference in their entireties.

FIELD

The disclosure relates to the field of video coding technologies, and in particular, to a motion estimation method and apparatus in a coding process, a device, a storage medium, and a program product.

BACKGROUND

Motion estimation is a widely used technology in video coding and processing in the field of video compression. In a related technology, when a coder performs motion estimation on a code block of a video frame, to improve coding accuracy, motion estimation is generally performed in a relatively large search range, for example, search is performed on pictures corresponding to multiple reference picture lists, so as to complete motion estimation on the code block. Although motion estimation accuracy in a coding process is improved in this manner, motion estimation efficiency of the code block is low, and a large amount of computing power is consumed.

SUMMARY

According to an aspect of one or more embodiments, there is provided a motion estimation method in a coding process, the motion estimation method comprising obtaining a video frame; determining a target code block from the video frame; obtaining reference motion information of an auxiliary code block of the target code block including motion information of N adjacent code blocks adjacent to the target code block, wherein N is an integer greater than or equal to 1; determining a target reference picture search range for the target code block from M reference picture lists based on picture search range information indicated by the reference motion information, wherein M is an integer greater than 1; and performing motion estimation on the target code block based on the target reference picture search range.

According to other aspects of one or more embodiments, there is also provided an apparatus consistent with the method and non-transitory computer readable medium storing computer code that is consistent with the method.

DETAILED DESCRIPTION

Figure 1:
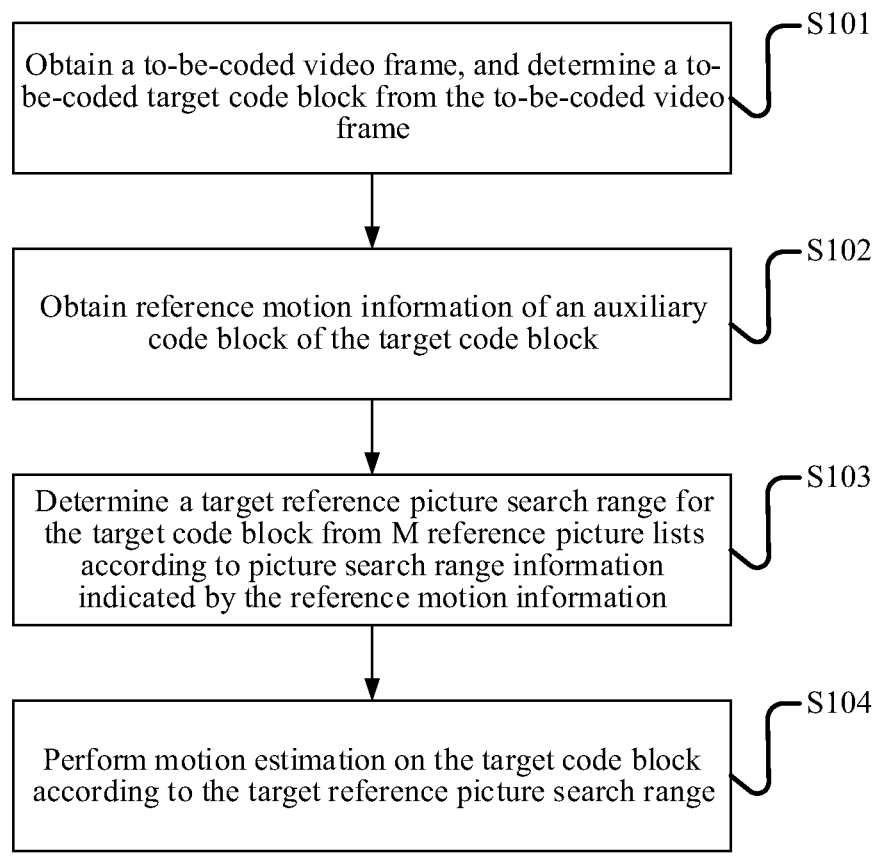
FIG. 1 is a schematic flowchart of a motion estimation method in a coding process according to some embodiments.

Certain embodiments are described in detail below with reference to the drawings. The described embodiments are not to be construed as a limitation to the present disclosure.

In the following descriptions, some related embodiments describe a subset of all possible embodiments. However, it may be understood that the some embodiments may be the same subset or different subsets of all the possible embodiments, and may be combined with each other without conflict.

"Plurality of", as mentioned in the specification means two or more. "And/or" describes an association relationship for describing associated objects and represents that three relationships may exist. For example, A/B may represent the following cases: Only A exists, both A and B exist, and only B exists. Similarly, the phrase "at least one of A and B" includes within its scope "only A", "only B" and "A and B". The character "/" in this specification generally indicates an "or" relationship between the associated objects unless otherwise noted or the context suggests otherwise.

Some embodiments provide a motion estimation method and apparatus in a coding process, an electronic device, a computer readable storage medium, and a computer program product, which can improve motion estimation efficiency in a video frame coding process.

Some embodiments provide a motion estimation method in a coding process, wherein the method may include obtaining a to-be-coded video frame, and determining a to-be-coded target code block from the to-be-coded video frame; obtaining reference motion information of an auxiliary code block of the target code block, the reference motion information of the auxiliary code block including: motion information of N adjacent code blocks adjacent to the target code block and motion information included in a reference code block list, and N being an integer greater than or equal to 1; determining a target reference picture search range for the target code block from M reference picture lists according to picture search range information indicated by the reference motion information, M being an integer greater than 1; and performing motion estimation on the target code block according to the target reference picture search range.

Some embodiments provide a motion estimation apparatus in a coding process, wherein the apparatus may include an obtaining unit, configured to obtain a to-be-coded video frame, and determine a to-be-coded target code block from the to-be-coded video frame; the obtaining unit being further configured to: obtain reference motion information of an auxiliary code block of the target code block, the reference motion information of the auxiliary code block including: motion information of N adjacent code blocks adjacent to the target code block and motion information included in a reference code block list, and N being an integer greater than or equal to 1; and a processing unit, configured to determine a target reference picture search range for the target code block from M reference picture lists according to picture search range information indicated by the reference motion information, M being an integer greater than 1; the processing unit being configured to perform motion estimation on the target code block according to the target reference picture search range.

Some embodiments provide a computer device, where the computer device includes an input device, an output device, a processor, and a computer storage medium, the processor and the computer storage medium are connected to each other, the computer storage medium is configured to store a computer program, and the processor is configured to invoke the computer program to execute the motion estimation method in the foregoing coding process.

Some embodiments provide a computer readable storage medium. The computer readable storage medium stores a computer program. When the computer program is executed by a processor, the motion estimation method in a coding process is implemented.

Some embodiments provide a computer program product, wherein the computer program product includes a computer program. The computer program is stored in a computer readable storage medium. When being executed by a processor of a computer device, the computer program performs the motion estimation method in a coding process.

The technical solutions provided in the embodiments of this application may enable reference motion information of the auxiliary code block to indicate a picture search range, wherein the reference picture search range of the code block may be determined by using the picture search range information indicated by the reference motion information, which can reduce a quantity of reference picture lists or reference pictures for searching for the target code block, skip searching in some reference picture lists or some reference pictures during motion estimation, reduce a calculation amount, reduce time complexity of motion estimation, and improve motion estimation efficiency of a video frame coding process.

Some embodiments of this application provide a motion estimation solution in a coding process. The motion estimation solution in a coding process provides a fast algorithm for motion estimation in a coding process, so that motion estimation of a code block in a video frame can be accelerated. A general principle of a fast algorithm involved in a motion estimation solution in a coding process is as follows: For a video frame to be coded, motion estimation (ME) may be performed on a target code block in the to-be-code video frame by using motion information of adjacent code blocks that are in a time domain and a space domain and that are adjacent to a target code block, and motion information included in history-based motion vector prediction (HMVP). First, at least one of motion information of N adjacent code blocks adjacent to the target code block and a history-based motion vector prediction list may be obtained, where the HMVP includes motion information, and N may be an integer greater than or equal to 1; and the history-based motion vector prediction list (which may be referred to as a reference code block list later) includes motion information of a code block that has been coded before the target code block and motion information of a coded block. Then, reference motion information of an auxiliary code block is determined from at least one of the motion information of the N adjacent code blocks and the motion information included in the reference code list, and a target reference picture search range is determined for the target code block from M reference picture lists based on picture search range information indicated by the reference motion information of the auxiliary code block. M is an integer greater than 1, and the auxiliary code block may be all or some of code blocks of the N adjacent code blocks and a reference code block recorded in the reference code list. In some embodiments, the target reference picture search range is allowed to include only picture search ranges corresponding to some of the M reference picture lists. Then, motion estimation is performed on the target code block based on the target reference picture search range, to obtain a target motion estimation parameter of the target code block. By using the reference motion information of the auxiliary code block, a quantity of reference picture lists for searching for the target code block can be reduced, and search for some reference picture lists when motion estimation is performed is skipped, thereby reducing time complexity of motion estimation, and accelerating motion estimation and video compression efficiency of the target code block.

In some embodiments, in addition to skipping some reference picture lists during motion estimation, the embodiments of this application may also skip some reference pictures during motion estimation. First, a condition parameter of an auxiliary code block of a reference search picture may be used when reference picture search is performed based on the reference motion information of the auxiliary code block, and when the condition parameter meets a filtering condition, the reference search picture may be used as the target reference picture search range of the target code block. The reference search picture may be one or more reference pictures in the M reference picture lists. For example, the M reference picture lists include a reference search picture 1. If a condition parameter of an auxiliary code block of the reference search picture 1 in the M reference picture lists meets a filtering condition, the reference search picture 1 is used as the target reference picture search range of the target code block, that is, when reference picture search is performed, the reference search picture 1 may be directly searched, so as to perform motion estimation on the target code block.

When the condition parameter does not meet the filtering condition, it means that when motion estimation is performed on the auxiliary code block, the reference search picture is rarely used. When motion estimation is performed on the target code block, the auxiliary code block may be used as a reference, and the reference search picture may not be used to some extent to perform motion estimation. Therefore, when motion estimation is performed on the target code block, the reference search picture may be directly skipped. For example, if the condition parameter of the auxiliary code block of the reference search picture 1 in the M reference picture lists does not meet the filtering condition in the foregoing example, it means that when motion estimation is performed on the auxiliary code block, the reference search picture 1 is not used, and when motion estimation is performed on the target code block, search on the reference search picture 1 may be directly skipped. In this manner, a quantity of reference pictures for searching for the target code block can be reduced, time complexity of motion estimation can be reduced, and motion estimation efficiency and video compression efficiency can be improved.

In some embodiments, embodiments of this application further provide motion estimation parameter search reset mechanisms during motion estimation, which can ensure stability of a fast algorithm. Before at least one of the motion information of the N adjacent code blocks adjacent to the target code block and the motion information of the reference code block is obtained, it may be determined whether the target code block can enable a fast algorithm. If it is determined that the target code block can use the fast algorithm, at least one of the motion information of the N adjacent code blocks adjacent to the target code block and the motion information of the reference code block may be obtained. If it is determined that the target code block cannot use the fast algorithm, the M reference picture lists are all used as the target reference picture search range of the target code block. By using the motion estimation parameter search reset mechanism, local optimization can be prevented when fast motion estimation is performed on a code block, that is, motion estimation is prevented from always being performed on a code block included in a to-be-coded video frame by using the same reference picture list or the same reference picture, thereby avoiding a problem that some motion estimation parameters cannot be updated when motion estimation is performed on the code block.

A motion estimation solution in coding processes provided in some embodiments of this application have the following beneficial effects: On one hand, a target reference picture search range is determined from M reference picture lists according to at least one of motion information of N adjacent code blocks adjacent to a target code block and motion information of a reference code block. The target reference picture search range may refer to at least one of some reference picture lists in the M reference picture lists or some reference pictures. In this way, a quantity of reference picture lists or reference pictures for searching for the target code block is reduced, and some reference picture lists or reference pictures during motion estimation are skipped, thereby reducing time complexity of motion estimation, and accelerating motion estimation on the target code block and reducing a calculation amount of motion estimation. On the other hand, a motion estimation parameter search reset mechanism in motion estimation can prevent falling into local optimum when fast motion estimation is performed on a code block, prevent a code block included in a video frame from always performing motion estimation by using the same reference picture list or the same reference picture, and avoid a problem that some motion parameters cannot be updated when motion estimation is performed on a code block.

Based on the foregoing provided motion estimation solution in the coding process, referring to FIG. 1, FIG. 1 is a schematic flowchart of a motion estimation method in a coding process according to some embodiments of this application. The motion estimation method in a coding process may be performed by a computer device, and the computer device may be a terminal device or a server. In actual application, the motion estimation method in a coding process may be performed by a coder in a computer device. The terminal device may be a smartphone, a tablet computer, a notebook computer, a desktop computer, an intelligent voice interaction device, a smart home appliance, an in-vehicle terminal, an aircraft, or the like. The server may be an independent physical server, or may be a server cluster or a distributed system formed by multiple physical servers, or may be a cloud server that provides basic cloud computing service such as a cloud service, a cloud database, cloud computing, a cloud function, cloud storage, a network service, cloud communication, a middleware service, a domain name service, a security service, a content distribution network (CDN), big data, and an artificial intelligence platform. The motion estimation method in a coding process described in this embodiment includes the following operations S101-S104.

S101: Obtain a to-be-coded video frame, and determine a to-be-coded target code block from the to-be-coded video frame. The to-be-coded video frame may be a picture collected in real time, or the to-be-coded video frame may be a picture collected in advance. The to-be-coded video frame may be any frame in a live video, a vehicle driving video, a vehicle real-time running video, a game video, an entertainment video, or the like. The to-be-coded video frame may include one or more code blocks. A size of each code block may be the same, or may be different. For example, a size of a code block 1 in the to-be-coded video frame may be 128, and a size of a code block 2 may be 64. In some embodiments, computer devices may randomly obtain, from the code blocks included in the to-be-coded video frame, one code block as the to-be-coded target code block, or each code block included in the to-be-coded video frame is numbered, and the computer device may determine, based on the number, all the code blocks included in the to-be-coded video frame as the to-be-coded target code blocks.

S102: Obtain reference motion information of an auxiliary code block of the target code block.

The reference motion information may include a reference picture list, a reference picture in a reference picture list (or a reference picture index in the reference picture list), and a motion vector (MV). The motion vector is a displacement between the target code block and a reference block (a reference block is a code block that meets a similarity threshold with the target code block).

Figure 2A:
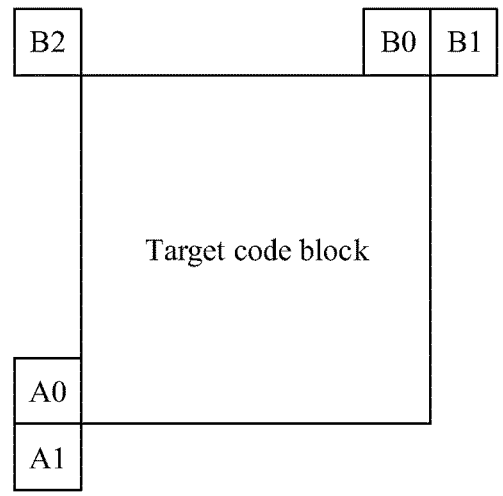
FIG. 2A is a schematic diagram of an adjacent code block adjacent to a target code block according to some embodiments.

In some embodiments, because motion estimation parameters of adjacent code blocks adjacent in a time domain and a space domain are highly correlated, there is a merge mode in versatile video coding (VVC), and motion information of an adjacent code block may be reused by a current code block. Therefore, in this embodiment of this application, the auxiliary code block may be N adjacent code blocks adjacent to the target code block, and the auxiliary code block may be all or some of code blocks in the N adjacent code blocks, where N is an integer greater than or equal to 1, and being adjacent here means being directly adjacent to the target code block. For example, in FIG. 2A, N is 5, and the N adjacent code blocks adjacent to the target code block may be a lower left adjacent code block (that is, A1 in FIG. 2A), a lower adjacent code block (that is, A0 in FIG. 2A), an upper left adjacent code block (that is, B2 in FIG. 2A), an upper adjacent code block (that is, B0 in FIG. 2A), and an upper right adjacent code block (that is, B1 in FIG. 2A). Correspondingly, the reference motion information of the auxiliary code block may include motion information of the N adjacent code blocks adjacent to the target code block.

In another embodiment, because an HMVP technology is introduced into the merge mode in versatile video coding (VVC), so as to extend the application scope of the merge mode, the merge mode may include motion information of a code block that is not directly adjacent to the target code block in space, and the motion information of the code block that is not directly adjacent to the target code block may be used for describing mutual shielding between moving objects, and thus the same object exists in a non-adjacent code block. In addition, by using the HMVP technology, a motion information queue (that is, a reference code block list) with a length of 5 may be constructed and maintained. The reference code block list may be used not only for recording available motion information for decoding, but also to be used as a reference when motion estimation is performed on the current code block (that is, the target code block), and when the current code block is coded, motion information in the HMVP list may be filled in a merge list from head to end until it is fully filled. An update principle of the HMVP list is first-in-first-out. Therefore, in this embodiment of this application, the auxiliary code block may be a code block in the reference code block list, and the auxiliary code block herein may be some code blocks or all code blocks in the reference code block list. The reference code block list includes a code block that has been previously coded before the target code block. The reference code block list may include N adjacent code blocks adjacent to the target code block (where the N adjacent code blocks are code blocks directly adjacent to the target code block) and code blocks that are not directly adjacent to the target code block in space. Correspondingly, the reference motion information of the auxiliary code block may include motion information included in the reference code block list.

In some embodiments, the N adjacent code blocks adjacent to the target code block and code blocks in the reference code block list may be used as auxiliary code blocks, so that subsequent reference motion information based on the auxiliary code blocks can better determine a target reference picture search range of the target code block. Correspondingly, the reference motion information of the auxiliary code block may include motion information of the N adjacent code blocks adjacent to the target code block and the motion information included in the reference code block list, where N is an integer greater than or equal to 1.

Figure 2B:
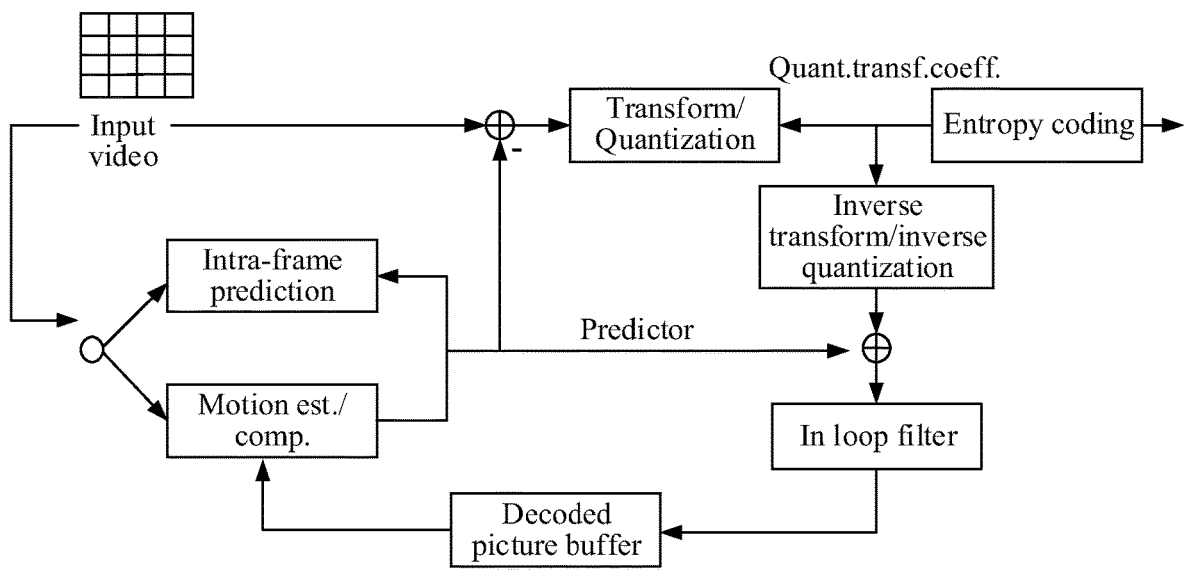
FIG. 2B is a schematic diagram of a coding framework of common video coding according to some embodiments.

In some embodiments, referring to FIG. 2B, FIG. 2B is a schematic diagram of a coding framework of VVC. The framework includes a decoded picture buffer (DPB) list. The decoded picture buffer list maintains reference motion information about the auxiliary code block. The computer device may obtain the reference motion information of the auxiliary code block from the decoded picture buffer list, and then perform operation S103.

S103: Determine a target reference picture search range for the target code block from M reference picture lists according to picture search range information indicated by the reference motion information, M being an integer greater than 1.

The picture search range information herein may include at least one of a reference picture list or a reference picture (reference picture index) in the reference picture list. The reference picture list may include at least two of a first reference picture list, a second reference picture list, and a bidirectional reference picture list (or referred to as a bidirectional reference frame list). The bidirectional reference picture list includes the first reference picture list and the second reference picture list. The first reference picture list includes multiple frames of reference pictures, the second reference picture list includes multiple frames of reference pictures, and the target reference picture search range may include a target reference picture list and a target reference picture in the target reference picture list. The target reference picture list may at least include any one of the first reference picture list and the second reference picture list. The first reference picture list may be a forward reference picture list (or referred to as a list0 reference picture list or a forward reference list), and the second reference picture list may be a backward reference picture list (or referred to as a list1 reference picture list or a backward reference list).

Next, an implementation of operation S103 is described:

(1) Because the auxiliary code block is coded (or subject to motion estimation) by using a reference picture list in M reference picture lists, and the auxiliary code block has a correlation with the target code block, the target code block is also coded by using the reference picture list in the M reference picture lists to a great extent. In this case, the picture search range information includes a reference picture list. Using the reference picture list indicated by the reference motion information of the auxiliary code block as a picture search range can reduce a quantity of reference picture lists for searching for the target code block, so that motion estimation of the target code block can be accelerated, and coding complexity is reduced.

In some embodiments, the computer device may determine a first condition parameter according to the picture search range information indicated by the reference motion information of the auxiliary code block, where the first condition parameter may include at least one of a quantity of first-type auxiliary code blocks and an area of a first-type auxiliary code block, the first-type auxiliary code block is a code block for searching for a reference picture in a first reference picture list in the M reference picture lists, and the first-type auxiliary code block belongs to auxiliary code blocks of the target code block. There is one or more first-type auxiliary code blocks. Then the computer device may determine whether the first condition parameter meets a first filtering condition. If it is determined that the first condition parameter meets the first filtering condition, the first reference picture list is determined as the target reference picture search range of the target code block, that is, when reference picture search is performed, the first reference picture list may be searched. If it is determined that the first condition parameter does not meet the first filtering condition, the first reference picture list is not used as the target reference picture search range of the target code block, that is, when reference picture search is performed, the first reference picture list may be skipped. The first filtering condition may include at least one of the following: The quantity of first-type auxiliary code blocks is greater than a quantity threshold, and a ratio of the area of the first-type auxiliary code block to an area sum of all auxiliary code blocks is greater than an area ratio threshold. The first reference picture list is a forward reference list.

When the first condition parameter is the quantity of first-type auxiliary code blocks, and the first filtering condition is that the quantity of first-type auxiliary code blocks is greater than the quantity threshold, the computer device may count the quantity of first-type auxiliary code blocks according to picture search range information indicated by the reference motion information of the auxiliary code block, and determine whether the quantity of first-type auxiliary code blocks is greater than the quantity threshold; if the quantity is greater than the quantity threshold, determine that the first condition parameter meets the first filtering condition; or if the quantity of first-type auxiliary code blocks is less than or equal to the quantity threshold, determine that the first condition parameter does not meet the first filtering condition.

When the first condition parameter is the area of the first-type auxiliary code block, it is assumed that the area of the first-type auxiliary code block is a first area, the area sum of all the auxiliary code blocks is a second area, and the first filtering condition is that a ratio of the first area to the second area is greater than the area ratio threshold. The computer device may determine the first-type auxiliary code block according to the picture search range information indicated by the reference motion information of the auxiliary code block, and calculate the area of the first-type auxiliary code block and the area sum of all the auxiliary code blocks; then calculate the area ratio between the area of the first-type auxiliary code block and the area sum of all the auxiliary code blocks, determine whether the area ratio is greater than the area ratio threshold, and if it is determined that the area ratio is greater than the area ratio threshold, determine that the first condition parameter meets the first filtering condition; or if it is determined that the area ratio is less than or equal to the area ratio threshold, determine that the first condition parameter does not meet the first filtering condition. There may be one or more first-type auxiliary code blocks. When there are multiple first-type auxiliary code blocks, the area of the first-type auxiliary code block refers to a sum of areas of all first-type auxiliary code blocks. For example, the area ratio threshold is set to 0.5, the first filtering condition is that the ratio of the first area to the second area is greater than 0.5, the quantity of auxiliary code blocks is 3 (which are respectively a code block 1, a code block 2, and a code block 3), and the first-type auxiliary code blocks are the code block 1 and the code block 2, and an area sum of the code block 1 and the code block 2 is calculated to obtain a first area sum. An area sum of the code block 1, the code block 2, and the code block 3 is calculated to obtain a second area sum. Then, the computer device may calculate that the area ratio between the first area sum and the second area sum is 0.6, where the area ratio 0.6 is greater than the area ratio threshold 0.5, and determine that the first condition parameter meets the first filtering condition.

The quantity threshold and the area ratio threshold may be determined according to at least one of a temporal layer at which the to-be-coded video frame is located or a target code block size. The temporal layer may be a temporal layer 0 (a temporal layer k=0), a temporal layer 1 (a temporal layer k=1), a temporal layer 2 (a temporal layer k=2), a temporal layer 3 (a temporal layer k=3), or the like. In some embodiments, a quantity of temporal layers may be different according to a coder type. For example, the quantity of temporal layers corresponding to a coder 1 may be 3 (that is, temporal layers 0-2), or a quantity of temporal layers corresponding to a coder 2 may be 4 (that is, temporal layers 0-3). The target code block size may be determined according to the temporal layer of the to-be-coded video frame. For example, when the temporal layer is the temporal layer 0, the target code block size may be 256, and when the temporal layer is the temporal layer 1, the target code block size is 128.

In some embodiments, when the quantity threshold and the area ratio threshold are determined according to the temporal layer at which the to-be-coded video frame is located, the higher the temporal layer at which the to-be-coded video frame is located, the smaller the quantity threshold and the area ratio threshold are. For example, the quantity threshold is used as an example, a relationship between the temporal layer and the quantity threshold may be preset. For example, the quantity threshold corresponding to the temporal layer 0 is 10, and the quantity threshold corresponding to the temporal layer 5 is 2.

In another embodiment, when the quantity threshold and the area ratio threshold are determined according to the size of the code block, a larger size of the code block results in a smaller quantity threshold and area ratio threshold, that is, a preset mapping relationship or correspondence exists between the size of the code block and the quantity threshold, and a preset mapping relationship or correspondence also exists between the size of the code block and the area ratio threshold. The mapping relationship or the correspondence may be a linear correlation. For example, the correspondence between the size of the code block and the quantity threshold may be preset by using the quantity threshold as an example. For example, the quantity threshold corresponding to a size 64 of the code block is 10, and the quantity threshold corresponding to a size 256 of the code block is 2. A manner of obtaining the quantity threshold is: obtaining the quantity threshold corresponding to the size of the target code block from the correspondence.

In some embodiments, when the quantity threshold and the area ratio threshold are determined according to the temporal layer at which the to-be-coded video frame is located and the size of the target code block, a correspondence among the quantity threshold, the temporal layer at which the to-be-coded video frame is located, and a code block size, and a correspondence among the area ratio threshold, the temporal layer at which the to-be-coded video frame is located, and the code block size may be preset, that is, when the temporal layer at which the to-be-coded video frame is located and the code block size are fixed, the quantity threshold and the area ratio threshold may be uniquely determined. Using the quantity threshold as an example, when the temporal layer 0 at which the to-be-coded video frame is located and the size of the code block is 256, the corresponding quantity threshold may be 10; when the temporal layer 1 at which the to-be-coded video frame is located and the size of the code block is 128, the corresponding quantity threshold may be 10; or when the temporal layer 1 at which the to-be-coded video frame is located and the size of the code block being 128, the corresponding quantity threshold may be 4.

In the foregoing cases, a manner of obtaining the quantity threshold is: obtaining at least one of the temporal layer at which the to-be-coded video frame is located or the size of the target code block, and then determining the quantity threshold or the area ratio threshold from the correspondence according to at least one of the temporal layer or the size of the target code block. For example, the temporal layer at which the to-be-coded video frame is located is 1, and the size of the target code block is 128. The quantity threshold is determined from the correspondence according to the temporal layer and the size of the target code block, that is, the first filtering condition is that the quantity of first-type auxiliary code blocks is greater than the quantity threshold 4. Similarly, the area ratio threshold may be obtained.

In some embodiments, a second condition parameter is determined according to the picture search range information indicated by the reference motion information of the auxiliary code block, where the second condition parameter includes at least one of a quantity of second-type auxiliary code blocks or an area of the second-type auxiliary code block, the second-type auxiliary code block is a code block that performs reference picture search on a second reference picture list in the M reference picture lists, and the second-type auxiliary code block belongs to the auxiliary code blocks of the target code block. Then, it is determined whether the second condition parameter meets a second filtering condition, and if it is determined that the second condition parameter meets the second filtering condition, the second reference picture list is used as the target reference picture search range of the target code block. If it is determined that the second condition parameter does not meet the second filtering condition, the second reference picture list is not used as the target reference picture search range, that is, the second reference picture list is skipped when reference picture search is performed. The second filtering condition may include at least one of the following: The quantity of second-type auxiliary code blocks is greater than the quantity threshold, and a ratio of a third area to a fourth area is greater than the area ratio threshold, where the third area is an area of the second-type auxiliary code block, and the fourth area is an area sum of all auxiliary code blocks. The second reference picture list is a backward reference list. The quantity threshold and the area ratio threshold may be determined according to at least one of a temporal layer at which the to-be-coded video frame is located or a target code block size. For an implementation of determining whether the second condition parameter meets the second filtering condition, refer to the foregoing implementation of determining whether the first condition parameter meets the first filtering condition.

In some embodiments, before the second condition parameter is determined according to the picture search range information indicated by the reference motion information of the auxiliary code block, whether the first condition parameter meets the first filtering condition may be first determined. If the first condition parameter does not meet the first filtering condition, the second condition parameter may be determined according to the picture search range information indicated by the reference motion information of the auxiliary code block, where the second condition parameter includes at least one of the quantity of the second-type auxiliary code blocks and the area of the second-type auxiliary code block, and the second-type auxiliary code block is a code block for performing reference picture search on the second reference picture list in the M reference picture lists, where the second-type auxiliary code block belongs to the auxiliary code blocks of the target code block. If the second condition parameter meets the second filtering condition, the second reference picture list is determined as the target reference picture search range of the target code block. If the second condition parameter does not meet the second filtering condition, at least the first reference picture list and the second reference picture list in the M reference picture lists are determined as the target reference picture search range of the target code block.

Because the auxiliary code block is coded (or subject to motion estimation) by using a reference picture (RP) of a reference picture list in the M reference picture lists, and the auxiliary code block is associated with the target code block, the target code block is also coded by using the reference picture of the reference picture list in the M reference picture lists to a great extent, for example, the auxiliary code block is coded by using a reference picture 1 of the first reference picture list, and the target code block is also coded by using the reference picture 1 of the first reference picture list to a great extent. In some embodiments, the picture search range information may include a reference picture list and a reference picture (or an index of the reference picture) included in the reference picture list. Using the reference picture list and the reference picture that are included in the reference motion information of the auxiliary code block as a picture search range of the code block can reduce a quantity of reference picture lists and a quantity of reference pictures for searching for the target code block, so that motion estimation can be performed on the target code block more quickly, thereby reducing coding complexity.

In some embodiments, after the first reference picture list is determined, the reference picture in the first reference picture list may be screened, so as to accelerate motion estimation of the target code block. If it is determined that the first condition parameter meets the first filtering condition, the target reference picture search range of the target code block may be determined based on the first reference picture list in the following manner: If the first condition parameter meets the first filtering condition, a third condition parameter is determined according to the reference picture corresponding to the reference motion information of the auxiliary code block, where the third condition parameter includes: at least one of a quantity of third-type auxiliary code blocks and an area of the third-type auxiliary code block, where the third-type auxiliary code block is a code block that performs reference picture search on a target reference picture in the first reference picture list, and the third-type auxiliary code block belongs to the auxiliary code blocks of the target code block. Then, it is determined whether the third condition parameter meets a third filtering condition. If the third condition parameter meets the third filtering condition, the target reference picture in the first reference picture list is determined as the target reference picture search range of the target code block. If the third condition parameter does not meet the third filtering condition, the target reference picture in the first reference picture list is not used as the target reference picture search range of the target code block, and when reference picture search is performed, search for the target reference picture in the first reference picture list is skipped, and another reference picture in the first reference picture list is searched. That is, the determining the first reference picture list as the target reference picture search range of the target code block includes: determining the target reference picture in the first reference picture list as the target reference picture search range of the target code block; and for the target reference picture in the first reference picture list, multiple auxiliary code blocks or large-area auxiliary code blocks of the target code block, the target reference picture is used as the reference picture search range.

The third filtering condition includes at least one of the following: The quantity of third-type auxiliary code blocks is greater than the quantity threshold and an area ratio between a fifth area and a sixth area is greater than the area ratio threshold, where the fifth area is the area of the third-type auxiliary code block, and the sixth area is an area sum of all the auxiliary code blocks. The quantity threshold and the area ratio threshold may be determined according to at least one of a temporal layer at which the to-be-coded video frame is located or a target code block size. There is a negative correlation between the temporal layer and the quantity threshold and the area ratio threshold, and there is a negative correlation between the size of the target code block and the quantity threshold and the area ratio threshold. The higher the temporal layer, the smaller the quantity threshold and the area ratio threshold. A larger size of the target code block results in a smaller quantity threshold and area ratio threshold.

In some embodiments, when the third condition parameter is the quantity of third-type auxiliary code blocks, and the third filtering condition is: The quantity of third-type auxiliary code blocks is greater than the quantity threshold, the process of determining whether the third condition parameter meets the third filtering condition is: If the first condition parameter meets the first filtering condition, determining the quantity of third-type auxiliary code blocks based on the reference picture corresponding to the reference motion information of the auxiliary code blocks, determining whether the quantity of third-type auxiliary code blocks is greater than the quantity threshold, and if the quantity is greater than the quantity threshold, determining that the third condition parameter meets the third filtering condition; or if it is determined that the quantity is less than or equal to the quantity threshold, determining that the third condition parameter does not meet the third filtering condition.

In some embodiments, when the third condition parameter is the area of the third-type auxiliary code block, and the third filtering condition is that the area ratio between the area of the third-type auxiliary code block and the area sum of all the auxiliary code blocks is greater than the area ratio threshold, an implementation process of determining whether the third condition parameter meets the third filtering condition is: If the first condition parameter meets the first filtering condition, determining the third-type auxiliary code block based on the reference picture corresponding to the reference motion information of the auxiliary code block, calculating the area of the third-type auxiliary code block and the area sum of all the auxiliary code blocks, then calculating the area ratio between the area of the third-type auxiliary code block and the area sum of all the auxiliary code blocks, and determining whether the area ratio is greater than the area ratio threshold, and if it is determined that the area ratio is greater than the area ratio threshold, determining that the third condition parameter meets the third filtering condition; or if it is determined that the area ratio is less than or equal to the area ratio threshold, determining that the third condition parameter does not meet the third filtering condition. The quantity of third-type auxiliary code blocks may be one or more. When the quantity of third-type auxiliary code blocks is multiple, the area of the third-type auxiliary code block refers to an area sum of all the third-type auxiliary code blocks. For example, the third-type auxiliary code blocks are an auxiliary code block 1 and an auxiliary code block 2, and all auxiliary code blocks are respectively an auxiliary code block 1, an auxiliary code block 2, and an auxiliary code block 3. The computer device may calculate an area sum of the auxiliary code block 1 and the auxiliary code block 2 to obtain a third area sum, and calculate an area sum of the auxiliary code block 1, the auxiliary code block 2, and the auxiliary code block 3 to obtain a fourth area sum. Then, an area ratio between the third area sum and the fourth area sum is calculated, and it is determined whether the area ratio is greater than the area ratio threshold.

In some embodiments, after a second reference picture list is determined, a reference picture in the second reference picture list may be screened, so as to accelerate motion estimation of the target code block. If it is determined that the second condition parameter meets the second filtering condition, an implementation of using the second reference picture list as the target reference picture search range of the target code block may be: if it is determined that the second condition parameter meets the second filtering condition, determining a fourth condition parameter according to the reference picture corresponding to the reference motion information of the auxiliary code block, where the fourth condition parameter includes at least one of a quantity of fourth-type auxiliary code blocks or an area of the fourth-type auxiliary code block, the fourth-type auxiliary code block is a code block that performs reference picture search on a target reference picture in the second reference picture list, and the fourth-type auxiliary code block belongs to the auxiliary code blocks of the target code block; determining whether the fourth condition parameter meets a fourth filtering condition; and if the fourth condition parameter meets a fourth filtering condition, determining the target reference picture included in the second reference picture list as the target reference picture search range of the target code block; or if the fourth condition parameter does not meet the fourth filtering condition, not using the target reference picture included in the second reference picture list as the target reference picture search range of the target code block, that is, when reference picture search is performed, the target reference picture included in the second reference picture list is skipped. That is, the using the second reference picture list as the target reference picture search range of the target code block includes: using the target reference picture in the second reference picture list as the target reference picture search range of the target code block; and for the target reference picture in the second reference picture list, multiple auxiliary code blocks or large-area auxiliary code blocks of the target code block, the target reference picture is used as the reference picture search range.

For how to determine whether the fourth condition parameter meets the fourth filtering condition, refer to the foregoing manner of determining whether the third condition parameter meets the third filtering condition. For a manner of obtaining the quantity threshold and the area ratio threshold, refer to a corresponding implementation. Details are not described herein again.

In some embodiments, there may be cases in which the first condition parameter does not meet the first filtering condition, and the second condition parameter does not meet the second filtering condition. In such cases, it means that the target reference picture search range cannot be determined from the M reference picture lists for the target code block based on the picture search range information indicated by the reference motion information. In such cases, the computer device may determine at least the first reference picture list and the second reference picture list in the M reference picture lists as the target reference picture search range. In some embodiments, all the M reference picture lists may be used as the target reference picture search range. For example, when the M reference picture lists include the first reference picture list, the second reference picture list, and a bidirectional reference picture list, all the first reference picture list, the second reference picture list, and the bidirectional reference picture list may be used as the target reference picture search range.

(2) Because the auxiliary code block is coded (or subject to motion estimation) by using a reference picture in M reference picture lists, and the auxiliary code block has a correlation with the target code block, the target code block is also coded by using the reference picture in the M reference picture lists to a great extent. For example, the auxiliary code block is coded by using a reference picture 1 in the M reference picture lists, and the target code block is also coded by using the reference picture 1 to a great extent. In some embodiments, the picture search range information includes a reference picture or the picture search range information includes a picture index of the reference picture. The picture search range information indicated by the reference motion information of the auxiliary code block includes the reference picture, so that a quantity of reference pictures for searching for the target code block can be reduced, and motion estimation of the target code block can be accelerated.

In some embodiments, when a target reference picture search range of the target code block is determined, a reference search picture to be searched may be determined by directly filtering the reference search picture in the multiple existing reference picture lists, and a reference search picture is determined as a target reference picture search range of the target code block. A different reference list does not need to be differentiated in a screening process. The computer device may determine a fifth condition parameter according to the picture search range information indicated by the reference motion information, where the fifth condition parameter includes at least one of a quantity of fifth-type auxiliary code blocks and an area of the fifth-type auxiliary code block, the fifth-type auxiliary code block is a code block that performs reference picture search on the reference search picture, and the fifth-type auxiliary code block belongs to the auxiliary code blocks of the target code block; and if the fifth condition parameter meets a fifth filtering condition, the reference search picture is used as the target reference picture search range of the target code block. Otherwise, the reference search picture is not used as the target reference picture search range of the target code block.

In some embodiments, a fifth-type auxiliary code block may be: a code block that performs reference picture search on reference search pictures in the M reference picture lists, and the fifth-type auxiliary code block belongs to auxiliary code blocks of the target code block. In some embodiemnts, a manner of determining a target reference picture search range for the target code block from M reference picture lists according to picture search range information indicated by the reference motion information may be: determining a fifth condition parameter according to the picture search range information indicated by the reference motion information, where the fifth condition parameter includes at least one of the quantity of fifth-type auxiliary code blocks and the area of the fifth-type auxiliary code block. For example, the M reference picture lists include a forward reference list, a backward reference list, and a bidirectional reference list, the forward reference list and the bidirectional reference list all include a target reference picture 1, and the fifth-type auxiliary code block is a code block that performs reference picture search on the target reference picture 1 in the auxiliary code blocks. Then, it is determined whether the fifth condition parameter meets a fifth filtering condition. If the fifth condition parameter meets the fifth filtering condition, the reference search picture in the M reference picture lists is determined as the target reference picture search range of the target code block, that is, when reference picture search is performed, the reference search picture may be directly searched. If the fifth condition parameter does not meet the fifth filtering condition, the reference search picture in the M reference picture lists is not used as the target reference picture search range of the target code block, that is, when reference picture search is performed, search for the reference search picture is skipped, so as to reduce a quantity of reference pictures for searching for the target code block. When the reference search picture is used as the target reference picture search range of the target code block, a reference picture list in which the reference search picture is located is carried. In this way, when picture search is subsequently performed, the reference picture list to which the reference search picture belongs may be known. For example, referring to a reference picture list 1 to which the reference search picture 1 belongs, the reference search picture 1 is carried with the reference picture list 1. The fifth filtering condition may include at least one of the following: The quantity of fifth-type auxiliary code blocks is greater than the quantity threshold, and an area ratio between the area of the fifth-type auxiliary code block and the area sum of all the auxiliary code blocks is greater than the area ratio threshold.

In some embodiments, the quantity of reference search pictures may be one or more. When the quantity of reference search pictures is multiple, multiple reference search pictures in the M reference picture lists may be determined as the target reference picture search range of the target code block. For example, there are five reference search pictures, and all the five reference search pictures may be used as the target reference picture search range of the target code block. When reference picture search is performed, the five reference search pictures may be searched. In some embodiments, some of the reference search pictures may be randomly selected from the multiple reference search pictures in the M reference picture lists as the target reference picture search range of the target code block. In some embodiments, when reference picture search is performed, a selected reference search picture may be searched, and a reference search picture that is not selected may be skipped. For example, there are 10 reference search pictures, and nine reference search pictures may be randomly selected as the target reference picture search range. When reference picture search is performed, the nine reference search pictures selected may be searched, and an unselected reference search picture may be skipped.

When the fifth condition parameter is the quantity of fifth-type auxiliary code blocks, and the fifth filtering condition is that the quantity of fifth-type auxiliary code blocks is greater than the quantity threshold, the computer device may count the quantity of fifth-type auxiliary code blocks according to the picture search range information indicated by the reference motion information of the auxiliary code block, and then determine whether the quantity of fifth-type auxiliary code blocks is greater than the quantity threshold, and if the quantity is greater than the quantity threshold, determine that the fifth condition parameter meets the fifth filtering condition; or if the quantity is less than or equal to the quantity threshold, determine that the fifth condition parameter does not meet the fifth filtering condition. For example, the M reference picture lists include the reference search picture 1, and the quantity threshold is 4. A quantity of auxiliary code blocks that perform picture search on the reference search picture 1 is 5, and the quantity 5 is greater than the quantity threshold 4. The computer device determines that the fifth condition parameter meets the fifth filtering condition.

When the fifth condition parameter is the area of the fifth-type auxiliary code block, it is assumed that the area of the fifth-type auxiliary code block is a seventh area, and the area sum of all the auxiliary code blocks is an eighth area. The fifth filtering condition is that the area ratio between the seventh area and the eighth area is greater than the area ratio threshold. The computer device may determine the fifth-type auxiliary code block according to the picture search range information indicated by the reference motion information of the auxiliary code block, and calculate the area ratio between the fifth-type auxiliary code block and the area sum of all the auxiliary code blocks, to determine whether the area ratio is greater than the area ratio threshold; if it is determined that the area ratio is greater than the area ratio threshold, determine that the fifth condition parameter meets the fifth filtering condition; and if it is determined that the area ratio is less than the area ratio threshold, determine that the fifth condition parameter does not meet the fifth filtering condition. For example, the area ratio threshold is 0.15, and the fifth-type auxiliary code blocks are respectively an auxiliary code block 1 and an auxiliary code block 2. Then, the computer device may calculate an area sum of the auxiliary code block 1 and the auxiliary code block 2 to obtain an area sum 1, and calculate the area sum of all the auxiliary code blocks to obtain an area sum 2. Then, the area ratio between the area sum 1 and the area sum 2 is calculated as 0.2. The area ratio 0.2 is greater than the area ratio threshold 0.15, and it is determined that the fifth condition parameter meets the fifth filtering condition.

The quantity threshold and the area ratio threshold may be determined according to at least one of a temporal layer at which the to-be-coded video frame is located or a target code block size. In actual application, the temporal layer at which the to-be-coded video frame is located has a negative correlation with the quantity threshold and the area ratio threshold, and the size of the target code block has a negative correlation with the quantity threshold and the area ratio threshold. For example, a higher temporal layer at which the to-be-coded video frame is located causes a smaller quantity threshold and area ratio threshold. For another example, a larger size of the target code block causes a smaller quantity threshold and area ratio threshold. For obtaining of the quantity threshold and the area ratio threshold, references may be made to the implementation of the foregoing corresponding part, and details are not described herein again.

In some embodiments, if a fifth condition parameter meets the fifth filtering condition, an implementation of determining the reference search picture in the M reference picture lists as the target reference picture search range of the target code block may be as follows: If the fifth condition parameter meets the fifth filtering condition, determining the reference search picture in the M reference picture lists as the candidate reference picture search range, where the candidate reference picture search range includes the reference search picture and the reference picture list to which the reference search picture belongs, and then the computer device may determine a sixth condition parameter according to the picture search range information indicated by the reference motion information, where the sixth condition parameter may include at least one of a quantity of sixth-type auxiliary reference code blocks and an area of the sixth-type auxiliary reference code block. The sixth-type auxiliary reference code block is a code block that performs reference picture search on a first reference picture list of a candidate reference picture search range, and the sixth-type auxiliary reference code block belongs to the auxiliary code blocks of the target code block to determine whether the sixth condition parameter meets a sixth filtering condition. If it is determined that the sixth condition parameter meets the sixth filtering condition, the reference search picture in the first reference picture list and the first reference picture list are determined as the target reference picture search range of the target code block. If it is determined that the sixth condition parameter does not meet the sixth filtering condition, the reference search picture in the first reference picture list and the first reference picture list are not determined as the target reference picture search range of the target code block. That is, when reference picture search is performed, the reference picture search range of the first reference picture list is skipped. The sixth filtering condition may include at least one of the following: The quantity of sixth-type auxiliary code blocks is greater than the quantity threshold, and a ratio of the area of the sixth-type auxiliary code blocks to the area sum of all the auxiliary code blocks is greater than the area ratio threshold. The quantity threshold and the area ratio threshold may be determined according to at least one of a temporal layer at which the to-be-coded video frame is located or a target code block size. The higher the temporal layer, the smaller the quantity threshold and the area ratio threshold. A larger size of the target code block results in a smaller quantity threshold and area ratio threshold.

In some embodiments, when the sixth condition parameter is the quantity of sixth-type auxiliary code blocks, and the sixth filtering condition is that the quantity of sixth-type auxiliary code blocks is greater than the quantity threshold, a manner of determining whether the sixth condition parameter meets the sixth filtering condition may be as follows: The computer device may determine the quantity of sixth-type auxiliary code blocks according to the picture search range information indicated by the reference motion information, and determine whether the quantity of sixth-type auxiliary code blocks is greater than the quantity threshold. If the quantity is greater than the quantity threshold, the sixth condition parameter meets the sixth filtering condition. If the quantity is less than or equal to the quantity threshold, the sixth condition parameter does not meet the sixth filtering condition.

In some embodiments, when the sixth condition parameter is the area of the sixth-type auxiliary code block, the sixth filtering condition is that the ratio of the area of the sixth-type auxiliary code block to the area sum of all the auxiliary code blocks is greater than the area ratio threshold. A manner of determining whether the sixth condition parameter meets the sixth filtering condition may be: The computer device may determine the sixth-type auxiliary code block according to the picture search range information indicated by the reference motion information, and calculate the area of the sixth-type auxiliary code block. Then, the ratio between the area of the sixth-type auxiliary code block and the area sum of all the auxiliary code blocks is calculated, and it is determined whether the ratio is greater than the area ratio threshold; and if the ratio is greater than the area ratio threshold, it is determined that the sixth condition parameter meets the sixth filtering condition; or if the ratio is less than or equal to the area ratio threshold, it is determined that the sixth condition parameter does not meet the sixth filtering condition.

In some embodiments, if the fifth condition parameter meets the fifth filtering condition, a manner of determining the reference search picture in the M reference picture lists as the target reference picture search range of the target code block may be as follows: If the fifth condition parameter meets the fifth filtering condition, determining the reference search picture in the M reference picture lists as the candidate reference picture search range, where the candidate reference picture search range includes the reference search picture and the reference picture list to which the reference search picture belongs, and then the computer device may determine a seventh parameter according to the picture search range information indicated by the reference motion information, where the seventh parameter may include: at least one of a quantity of seventh-type auxiliary code blocks and an area of the seventh type of auxiliary code block, where the seventh-type auxiliary code block is a code block that performs reference picture search on a second reference picture list in a candidate reference picture search range, and the seventh-type auxiliary code block belongs to the auxiliary code blocks of the target code block. Then, it is determined whether the seventh condition parameter meets a seventh filtering condition; and if it is determined that the seventh condition parameter meets the seventh filtering condition, the second reference picture list and the reference search picture in the second reference picture list are determined as the target reference picture search range of the target code block; or if it is determined that the seventh condition parameter does not meet the seventh filtering condition, the second reference picture list and the reference search picture in the second reference picture list are not determined as the target reference picture search range of the target code block, that is, when reference picture search is performed, search for the second reference picture list is skipped. The seventh filtering condition may include at least one of the following: The quantity of seventh-type auxiliary code blocks is greater than the quantity threshold, and the ratio of the area of the seventh-type auxiliary code block to the area sum of all auxiliary code blocks is greater than the area ratio threshold. The quantity threshold and the area ratio threshold may be determined according to at least one of a temporal layer at which the to-be-coded video frame is located or a target code block size.

The higher the temporal layer, the smaller the quantity threshold and the area ratio threshold. A larger size of the target code block results in a smaller quantity threshold and area ratio threshold. For a manner of determining whether the seventh condition parameter meets the seventh filtering condition and a manner of obtaining the quantity threshold and the area ratio threshold, references may be made to the foregoing corresponding embodiments, and details are not described herein again.

In some embodiments, if the fifth condition parameter does not meet the fifth filtering condition, feature information of the target code block is obtained, where the feature information includes the temporal layer at which the to-be-coded video frame is located; and the feature information includes the temporal layer at which the to-be-coded video frame is located and the size of the target code block; or if the feature information of the target code block meets a trigger condition, obtaining the reference motion information of the auxiliary code block of the target code block is triggered; or if the feature information of the target code block does not meet the trigger condition, at least the first reference picture list and the second reference picture list in the M reference picture lists are determined as the target reference picture search range of the target code block.

S104: Perform motion estimation on the target code block according to the target reference picture search range.

The target reference picture search range includes a target reference picture list and a target reference picture corresponding to the target reference picture list.

In some embodiments, a computer device may perform motion estimation according to a target reference picture search range and by using a first reference picture search rule to obtain a first motion estimation parameter of the target code block, perform motion estimation according to the target reference picture search range and by using a second reference picture search rule to obtain a second motion estimation parameter of the target code block, and determine an optimal motion estimation parameter as a target motion estimation parameter of the target code block from the first motion estimation parameter and the second motion estimation parameter. The first reference picture search rule may be a translation motion estimation (ME) model, and the second reference picture search rule may be an affine ME model. The determining, by the computer device from the first motion estimation parameter and the second motion estimation parameter, the optimal motion estimation parameter as the target motion estimation parameter of the target code block may be: determining a motion estimation parameter corresponding to minimum rate distortion (RD) as the optimal motion estimation parameter, and using the optimal motion estimation parameter as the target motion estimation parameter of the target code block. Compared with a VVC test model (VTM), a predefined search template and rule are used for reducing a quantity of RD calculation times in a motion estimation process. In some embodiments, by using the target reference picture search range obtained in operation S103, the quantity of RD calculation times in the motion estimation process can be reduced, so that motion estimation of the target code block is accelerated, and accuracy of obtaining the target motion estimation parameter of the target code block based on the target reference picture search range can be ensured relatively accurately.

In some embodiments, a to-be-coded video frame is obtained, and a to-be-coded target code block is determined from the to-be-coded video frame. Reference motion information of an auxiliary code block of the target code block is obtained. A target reference picture search range for the target code block is determined from M reference picture lists according to picture search range information indicated by the reference motion information, where M is an integer greater than 1; and motion estimation is performed on the target code block according to the target reference picture search range. The reference motion information of the auxiliary code block is used for reducing a quantity of reference picture lists or reference pictures for searching for the target code block, skipping searching for some reference picture lists or some reference pictures during motion estimation, reducing a calculation amount, reducing time complexity of motion estimation, and improving motion estimation efficiency of a video frame coding process.

Figure 3:
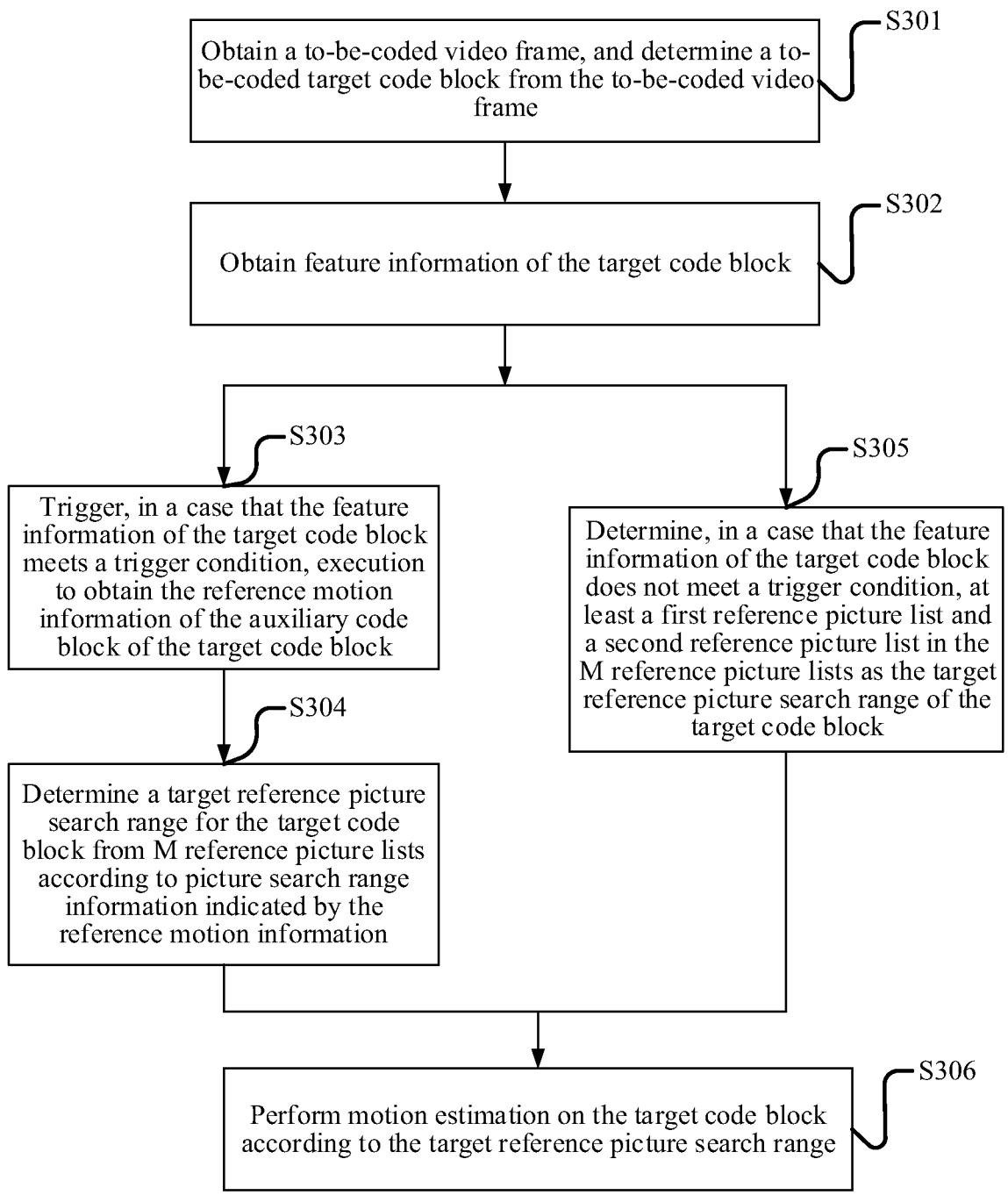
FIG. 3 is a schematic flowchart of another motion estimation method in a coding process according to some embodiments.

Based on the foregoing motion estimation solution in the coding process, FIG. 3 is a schematic flowchart of a motion estimation method in a coding process. The motion estimation method in a coding process may be performed by a computer device, and the computer device may be a terminal device or a server. In actual application, the motion estimation method in a coding process may be performed by a coder in a computer device. The terminal device may be a smartphone, a tablet computer, a notebook computer, a desktop computer, an intelligent voice interaction device, a smart home appliance, an in-vehicle terminal, an aircraft, or the like. The server may be an independent physical server, or may be a server cluster or a distributed system formed by multiple physical servers, or may be a cloud server that provides basic cloud computing service such as a cloud service, a cloud database, cloud computing, a cloud function, cloud storage, a network service, cloud communication, a middleware service, a domain name service, a security service, a content distribution network (CDN), big data, and an artificial intelligence platform. The motion estimation method in a coding process described in some embodiments includes the following operations S301-S306.

S301: Obtain a to-be-coded video frame, and determine a to-be-coded target code block from the to-be-coded video frame.

S302: Obtain feature information of the target code block.

Herein, the feature information includes a temporal layer at which the to-be-coded video frame is located, or the feature information includes a temporal layer at which the to-be-coded video frame is located and a size of the target code block. The temporal layer may be a temporal layer 0, a temporal layer 1, a temporal layer 2, a temporal layer 3, a temporal layer 4, a temporal layer 5, or the like, and the size of the target code block may be 256, 128, 64, 32, or the like.

In some embodiments, for an important video frame or to prevent a problem that a target motion estimation parameter cannot be updated, a trigger condition may be predefined. The computer device may determine whether the obtained feature information of the target code block meets the trigger condition. The trigger condition is used for triggering obtaining of reference motion information of an auxiliary code block of the target code block. If it is determined that the feature information of the target code block meets the trigger condition, fast motion estimation may be performed on the target code block, and operation S303 may be performed. If it is determined that the feature information of the target code block does not meet the trigger condition, the video frame may be indicated as an important video frame. When the video frame is an important video frame, a target reference picture search range may not be able to be determined from M reference picture lists for the target code block according to the picture search range information indicated by the reference motion information to perform fast motion estimation on the target code block, and the computer device may perform operation S305.

In some embodiments, when the feature information of the target code block includes the temporal layer at which the to-be-coded video frame is located, the trigger condition may be that the temporal layer at which the to-be-coded video frame is located is greater than a temporal layer threshold, that is, fast motion estimation is disabled on a code block included in a video frame at a low temporal layer, so as to ensure coding efficiency. The computer device may determine whether the temporal layer at which the to-be-coded video frame is located included in the feature information of the target code block is greater than the temporal layer threshold. If it is determined that the temporal layer at which the to-be-coded video frame is located is greater than the temporal layer threshold, fast motion estimation may be performed on the target code block, and, operation S303 may be performed. If it is determined that the temporal layer at which the to-be-coded video frame is located is less than or equal to the temporal layer threshold, it means that the to-be-coded video frame is a key frame, and fast motion estimation cannot be performed on the target code block, and operation S305 may be performed.

In some embodiments, when the feature information of the target code block includes the temporal layer at which the to-be-coded video frame is located and the size of the target code block, the trigger condition may include a predefined code block size corresponding to each temporal layer. For example, in a random access (RA) configuration, a predefined code block size corresponding to the temporal layer 0 is 256, a predefined code block size corresponding to the temporal layer 1 is 128, a predefined code block size corresponding to the temporal layer 2 is 128, a predefined code block size corresponding to the temporal layer 3 is 64, a predefined code block size corresponding to the temporal layer 4 is 64, and a predefined code block size corresponding to the temporal layer 5 is 32. The predefined code block size corresponding to each temporal layer in some embodiments may be set, and is not limited to the predefined code block size corresponding to each temporal layer in the foregoing example. Then, a process in which the computer device may determine whether the feature information of the target code block meets the trigger condition is: The computer device determines, according to the temporal layer at which the to-be-coded video frame is located, the predefined code block size corresponding to the temporal layer at which the to-be-coded video frame is located from the predefined code block size corresponding to each temporal layer. Then it is determined whether the size of the target code block is greater than a target predefined code block size. If it is determined that the size of the target code block is greater than the target predefined code block size, fast motion estimation may be performed on the target code block, and operation S303 is performed. If it is determined that the size of the target code block is less than or equal to the target predefined code block size, fast motion estimation cannot be performed on the target code block, and operation S305 is performed.

For example, the temporal layer at which the to-be-coded video frame is located is 0, and the size of the target code block is 256. The computer device may determine, based on the temporal layer 0 at which the to-be-coded video frame is located, that a predefined code block size corresponding to the temporal layer 0 is 128 from the predefined code block size corresponding to each temporal layer. Then the computer device determines that the size of the target code block is greater than the predefined code block size (that is, 256 is greater than 128), and may perform fast motion estimation on the target code block. For another example, a temporal layer at which the to-be-coded video frame is located is 0, and the size of the target code block is 64. The computer device determines that the size of the target code block is less than the predefined code block size (that is, 64 is less than 128), and cannot perform fast motion estimation on the target code block. At least a first reference picture list and a second reference picture list in the M reference picture lists may be used as the target reference picture search range.

S303: Trigger, based on the feature information of the target code block meeting a trigger condition, execution to obtain the reference motion information of the auxiliary code block of the target code block.

S304: Determine a target reference picture search range for the target code block from M reference picture lists according to picture search range information indicated by the reference motion information.

Herein, M is an integer greater than 1.

For an implementation of operation S304, refer to the implementation of the corresponding part in FIG. 1. Details are not described herein again.

S305: Determine, based on the feature information of the target code block not meeting a trigger condition, at least a first reference picture list and a second reference picture list in the M reference picture lists as the target reference picture search range of the target code block.

The first reference picture list may be a forward reference picture list, and the second reference picture list may be a backward reference picture list.

In some embodiments, when the M reference picture lists include the first reference picture list and the second reference picture list, if it is determined that the feature information of the target code block does not meet the trigger condition, both the first reference picture list and the second reference picture list are used as the target reference picture search range.

In some embodiments, when the M reference picture lists include the first reference picture list, the second reference picture list, and a bidirectional reference picture list, if it is determined that the feature information of the target code block does not meet the trigger condition, the first reference picture list and the first reference picture list may be used as the target reference picture search range, or if it is determined that the feature information of the target code block does not meet the trigger condition, the first reference picture list, the first reference picture list, and the bidirectional reference picture list may be used as the target reference picture search range.

S306: Perform motion estimation on the target code block according to the target reference picture search range.

In some embodiments, for a procedure of performing motion estimation on the target code block according to the target reference picture search range, references may be made to the implementation of operation S104. The computer device determines a target reference picture corresponding to the target reference picture search range and a target reference picture corresponding to the target reference picture list, where a quantity of target reference pictures may be one or more; then performs motion estimation according to the target reference picture list and the target reference picture corresponding to the target reference picture list and by using a first reference picture search rule, to obtain a first motion estimation parameter of the target code block; performs motion estimation according to the target reference picture list and the target reference picture corresponding to the target reference picture list and by using a second reference picture search rule, to obtain a second motion estimation parameter of the target code block, where the second reference picture search rule is different from the first reference picture search rule; and selects a target motion estimation parameter for the target code block from the first motion estimation parameter and the second motion estimation parameter.

Each target reference picture includes one or more code blocks, and an implementation in which motion estimation is performed according to the target reference picture list and the target reference picture corresponding to the target reference picture list by using the first reference picture search rule to obtain the first motion estimation parameter of the target code block may be: traversing, by using the first reference picture search rule, the target reference picture in the target reference picture list, then determining, by using a rate distortion (RD) cost as a criterion, a first matching block with lowest rate distortion from code blocks included in the target reference picture corresponding to the target reference picture list, and determining a motion parameter corresponding to the first matching block with the lowest rate distortion as the first motion estimation parameter of the target code block. Similarly, an implementation in which motion estimation is performed according to the target reference picture list and the target reference picture corresponding to the target reference picture list by using the second reference picture search rule to obtain the second motion estimation parameter of the target code block may be: traversing, by using the second reference picture search rule, the target reference picture in the target reference picture list, determining, by using the rate distortion (RD) cost as a criterion, a second matching block with minimum rate distortion from the code blocks included in the target reference picture corresponding to the target reference picture list, and determining a motion estimation parameter corresponding to the second matching block as the second motion estimation parameter of the target code block. The second reference picture search rule is a solution rule of a gradient descent method, a loss function of the second reference picture search rule is a minimum mean square error (MSE) of a code block before and after motion estimation, and an initial motion estimation parameter of the second reference picture search rule is determined by a motion estimation parameter of the first reference picture search rule.

Figure 4:
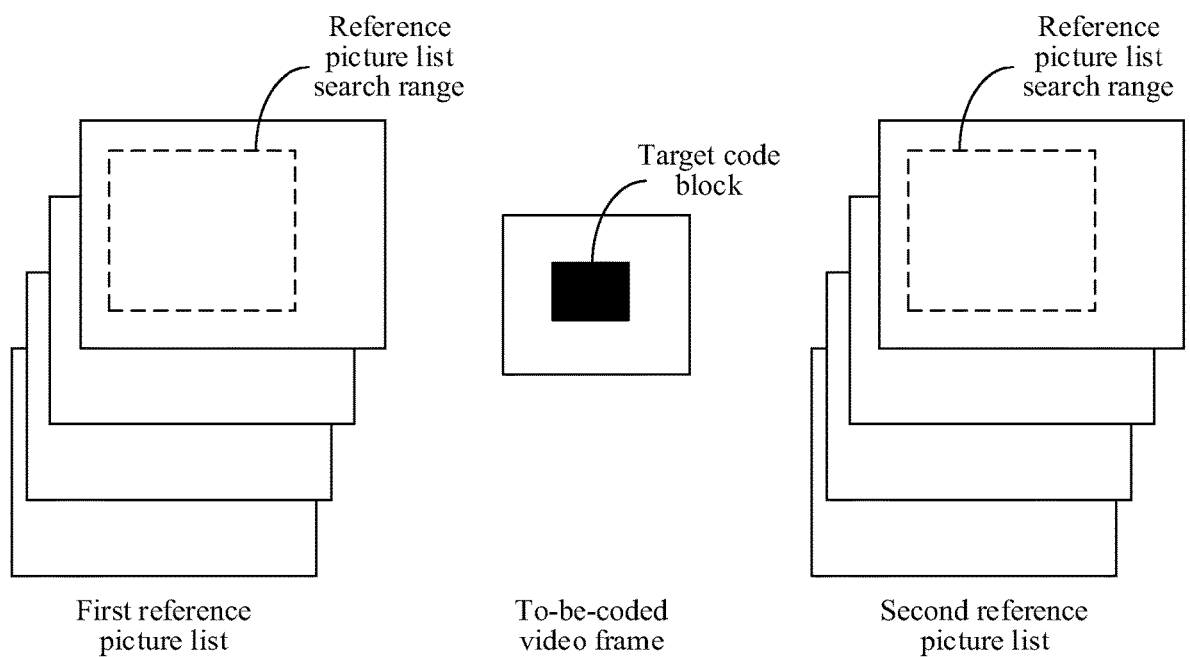
FIG. 4 is a schematic diagram of motion estimation according to some embodiments.

In some embodiments, when the target reference picture search range includes at least the first reference picture list and the second reference picture list in the M reference picture lists, referring to FIG. 4, FIG. 4 is a schematic diagram of performing motion estimation on a target code block by using a first reference picture search rule. An implementation in which the computer device performs motion estimation according to the target reference picture list and the target reference picture corresponding to the target reference picture list by using the first reference picture search rule to obtain the first motion estimation parameter of the target code block may be: traversing all reference pictures in the first reference picture list and the second reference picture list according to the first reference picture search rule, separately determining, with the rate distortion cost as a criterion, a first matching block with minimum rate distortion from the code blocks included in the target reference picture corresponding to the first reference picture list, and determining a second matching block with minimum rate distortion from the code blocks included in the target reference picture corresponding to the second reference picture list, then performing weighted summation processing on the first matching block and the second matching block to obtain a bidirectional matching block, and then determining a motion estimation parameter corresponding to the matching block with the minimum rate distortion from a motion estimation parameter corresponding to the first matching block, a motion estimation parameter corresponding to the second matching block, and a motion estimation parameter corresponding to the bidirectional matching block and using it as the first motion estimation parameter of the target code block.

In some embodiments, to select an optimal motion estimation parameter as a target motion estimation parameter of a target code block, a rate distortion corresponding to the first motion estimation parameter and a rate distortion corresponding to the second motion estimation parameter may be compared, so as to select the optimal motion estimation parameter. An implementation of selecting the target motion estimation parameter for the target code block from the first motion estimation parameter and the second motion estimation parameter may be: obtaining the first rate distortion corresponding to the first motion estimation parameter and the second rate distortion corresponding to the second motion estimation parameter; and then comparing the first rate distortion and the second rate distortion, and if it is determined that the first rate distortion is greater than the second rate distortion, determining the second motion estimation parameter corresponding to the second rate distortion as the target motion estimation parameter of the target code block; or if it is determined that the second rate distortion is greater than the first rate distortion, determining the first motion estimation parameter corresponding to the first rate distortion as the target motion estimation parameter of the target code block. If it is determined that the first rate distortion and the second rate distortion are the same, both the first motion estimation parameter and the second motion estimation parameter may be determined as the target motion estimation parameter of the target code block. In some embodiments, if it is determined that the first rate distortion and the second rate distortion are the same, the first motion estimation parameter or the second motion estimation parameter may be determined as the target motion estimation parameter of the target code block.

In some embodiments, the computer device may obtain a to-be-coded video frame, and determine a to-be-coded target code block from the to-be-coded video frame; and obtain feature information of the target code block, where the feature information includes a temporal layer at which the to-be-coded video frame is located, or the feature information includes a temporal layer at which the to-be-coded video frame is located and a size of the target code block. A trigger condition may be set to control whether fast motion estimation is performed on the target code block, so as to prevent motion estimation from being performed on each code block in a video frame coding process by using the same reference picture list or the same reference picture, and falling within a local optimum. On the other hand, if feature information of the target code block meets the trigger condition, the target code block is triggered to obtain reference motion information of an auxiliary code block of the target code block. A target reference picture search range for the target code block is determined from M reference picture lists according to picture search range information indicated by the reference motion information; or if the feature information of the target code block does not meet the trigger condition, at least a first reference picture list and a second reference picture list in the M reference picture lists are used as the target reference picture search range of the target code block, and motion estimation is performed on the target code block according to the target reference picture search range. When the feature information of the target code block meets the trigger condition, fast motion estimation may be performed on the target code block. By determining the target reference picture search range, a calculation amount may be reduced, motion estimation of the target code block is improved, and coding efficiency is improved.

Figure 5:
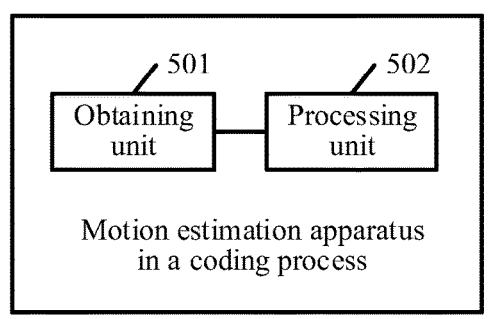
FIG. 5 is a schematic structural diagram of a motion estimation apparatus in a coding process according to some embodiments.

Some embodiments further disclose a motion estimation apparatus in a coding process. The motion estimation apparatus in a coding process may be a computer program (including program code) running on the foregoing computer device. The motion estimation apparatus in a coding process may perform the methods shown in FIG. 1 and FIG. 3. Referring to FIG. 5, the motion estimation apparatus in a coding process may include the following units:

an obtaining unit 501, configured to obtain a to-be-coded video frame, and determine a to-be-coded target code block from the to-be-coded video frame;

the obtaining unit 501 being further configured to: obtain reference motion information of an auxiliary code block of the target code block, the reference motion information of the auxiliary code block including: motion information of N adjacent code blocks adjacent to the target code block and motion information included in a reference code block list, and N being an integer greater than or equal to 1; and a processing unit 502, configured to determine a target reference picture search range for the target code block from M reference picture lists according to picture search range information indicated by the reference motion information, M being an integer greater than 1;

the processing unit 502 being configured to perform motion estimation on the target code block according to the target reference picture search range.

In some embodiments, the processing unit 502 is further configured to:

determine a first condition parameter according to the picture search range information indicated by the reference motion information of the auxiliary code block; the first condition parameter including at least one of the following: a quantity of first-type auxiliary code blocks and an area of a first-type auxiliary code block; and the first-type auxiliary code block being a code block that performs reference picture search on a first reference picture list in the M reference picture lists, the first-type auxiliary code block belonging to auxiliary code blocks of the target code block, and the first reference picture list being a forward reference list; and determine, based on the first condition parameter meeting a first filtering condition, the first reference picture list as the target reference picture search range of the target code block.

In some embodiments, the processing unit 502 is further configured to:

determine a second condition parameter according to the picture search range information indicated by the reference motion information of the auxiliary code block; the second condition parameter including at least one of the following: a quantity of second-type auxiliary code blocks and an area of a second-type auxiliary code block; and the second-type auxiliary code block being a code block that performs reference picture search on a second reference picture list in the M reference picture lists, the second-type auxiliary code block belonging to auxiliary code blocks of the target code block, and the second reference picture list being a backward reference list; and determine, based on the second condition parameter meeting a second filtering condition, the second reference picture list as the target reference picture search range of the target code block.

In some embodiments, the processing unit 502 is further configured to:

before determining the second condition parameter according to the picture search range information indicated by the reference motion information of the auxiliary code block, obtain a first condition parameter and a first filtering condition, and determine whether the first condition parameter meets the first filtering condition; and determine, based on the first condition parameter not meeting the first filtering condition, the second condition parameter according to the picture search range information indicated by the reference motion information of the auxiliary code block;

the first condition parameter including at least one of the following: a quantity of first-type auxiliary code blocks and an area of a first-type auxiliary code block; and the first-type auxiliary code block being a code block that performs reference picture search on a first reference picture list in the M reference picture lists, the first-type auxiliary code block belonging to auxiliary code blocks of the target code block, and the first reference picture list being a forward reference list.

In some embodiments, the processing unit 502 is further configured to:

determine, based on the first condition parameter meeting the first filtering condition, a third condition parameter according to a reference picture corresponding to the reference motion information of the auxiliary code block; the third condition parameter including at least one of the following: a quantity of third-type auxiliary code blocks and an area of a third-type auxiliary code block; and the third-type auxiliary code block being a code block that performs reference picture search on a target reference picture in the first reference picture list, and the third-type auxiliary code block belonging to the auxiliary code blocks of the target code block; and determine, based on the third condition parameter meeting a third filtering condition, the target reference picture in the first reference picture list as the target reference picture search range of the target code block.

In some embodiments, the processing unit 502 is further configured to:

determine, based on the second condition parameter meeting the second filtering condition, a fourth condition parameter according to a reference picture corresponding to the reference motion information of the auxiliary code block; the fourth condition parameter including at least one of the following: a quantity of fourth-type auxiliary code blocks and an area of a fourth-type auxiliary code block; and the fourth-type auxiliary code block being a code block that performs reference picture search on a target reference picture in the second reference picture list, and the fourth-type auxiliary code block belonging to the auxiliary code blocks of the target code block; and determine, based on the fourth condition parameter meeting a fourth filtering condition, the target reference picture in the second reference picture list as the target reference picture search range of the target code block.

In some embodiments, the processing unit 502 is further configured to:
  determine a fifth condition parameter according to the picture search range information indicated by the reference motion information; the fifth condition parameter including at least one of the following: a quantity of fifth-type auxiliary code blocks and an area of a fifth-type auxiliary code block; and the fifth-type auxiliary code block being a code block that performs reference picture search on reference search pictures in the M reference picture lists, and the fifth-type auxiliary code block belonging to auxiliary code blocks of the target code block; and
  determine, based on the fifth condition parameter meeting a fifth filtering condition, the reference search pictures as the target reference picture search range of the target code block.

In some embodiments, the obtaining unit 501 is further configured to: before obtaining the reference motion information of the auxiliary code block of the target code block, obtain feature information of the target code block, the feature information including a temporal layer at which the to-be-coded video frame is located, or the feature information including a temporal layer at which the to-be-coded video frame is located and a size of the target code block; and
  the processing unit 502 is further configured to: trigger, based on the feature information of the target code block meeting a trigger condition, execution to obtain the reference motion information of the auxiliary code block of the target code block; or
  use, based on the feature information of the target code block not meeting a trigger condition, at least a first reference picture list and a second reference picture list in the M reference picture lists as the target reference picture search range of the target code block.

In some embodiments, the processing unit 502 is further configured to:
  determine a target reference picture list corresponding to the target reference picture search range and a target reference picture corresponding to the target reference picture list;
  perform motion estimation according to the target reference picture list and the target reference picture corresponding to the target reference picture list and by using a first reference picture search rule, to obtain a first motion estimation parameter of the target code block;
  perform motion estimation according to the target reference picture list and the target reference picture corresponding to the target reference picture list and by using a second reference picture search rule, to obtain a second motion estimation parameter of the target code block, the second reference picture search rule being different from the first reference picture search rule; and
  select a target motion estimation parameter of the target code block from the first motion estimation parameter and the second motion estimation parameter.

In some embodiments, the obtaining unit 501 is further configured to: obtain first rate distortion corresponding to the first motion estimation parameter and second rate distortion corresponding to the second motion estimation parameter; and determine, based on the first rate distortion being greater than the second rate distortion, the second motion estimation parameter corresponding to the second rate distortion as the target motion estimation parameter of the target code block; or determine, based on the second rate distortion being greater than the first rate distortion, the first motion estimation parameter corresponding to the first rate distortion as the target motion estimation parameter of the target code block.

According to some embodiments operations involved in the methods shown in FIG. 1 and FIG. 3 may be performed by units in the motion estimation apparatus in a coding process shown in FIG. 5. For example, operation S101 and operation S102 shown in FIG. 1 are performed by the obtaining unit 501 shown in FIG. 5, and operation S103 and operation S104 are performed by the processing unit 502 shown in FIG. 5. For another example, operation S301 and operation S302 shown in FIG. 3 are performed by the obtaining unit 501 shown in FIG. 5, and operation S303 to operation S306 are performed by the processing unit 502 shown in FIG. 5.

According some embodiments, units of the motion estimation apparatus in a coding process shown in FIG. 5 may be separately or wholly combined into one or several other units, or one (or more) of the units herein may further be divided into multiple units of smaller functions. In this way, the same operations can be implemented, and implementation of the technical effects of the disclosure are not affected. The foregoing units are divided based on logical functions. In an actual application, a function of one unit may be implemented by multiple units, or functions of multiple units are implemented by one unit. In some embodiments, the motion estimation apparatus in a coding process may also include another unit. In actual application, these functions may also be implemented by another unit, and may be implemented by multiple units in cooperation.

According to some embodiments, processing elements and storage elements such as a central processing unit (CPU), a random access memory (RAM), and a read only memory (ROM) may be included. For example, a computer program (including program code) that can execute operations involved in the corresponding methods shown in FIG. 1 and FIG. 3 is run on a general computing device of a computer, so as to construct the motion estimation apparatus in a coding process shown in FIG. 5, and implement the motion estimation method in a coding process according to some embodiments. The computer program may be recorded in, for example, a computer readable recording medium, and may be loaded into the foregoing computing device by using the computer readable recording medium, and run in the computer device.

In some embodiments, a to-be-coded video frame is obtained, and a to-be-coded target code block is determined from the to-be-coded video frame. Reference motion information of an auxiliary code block of the target code block is obtained. A target reference picture search range for the target code block is determined from M reference picture lists according to picture search range information indicated by the reference motion information, where M is an integer greater than 1; and motion estimation is performed on the target code block according to the target reference picture search range. The reference motion information of the auxiliary code block is used for reducing a quantity of reference picture lists or reference pictures for searching for the target code block, skipping searching for some reference picture lists or some reference pictures during motion estimation, reducing a calculation amount, reducing time complexity of motion estimation, and improving motion estimation efficiency of a video frame coding process.

Figure 6:
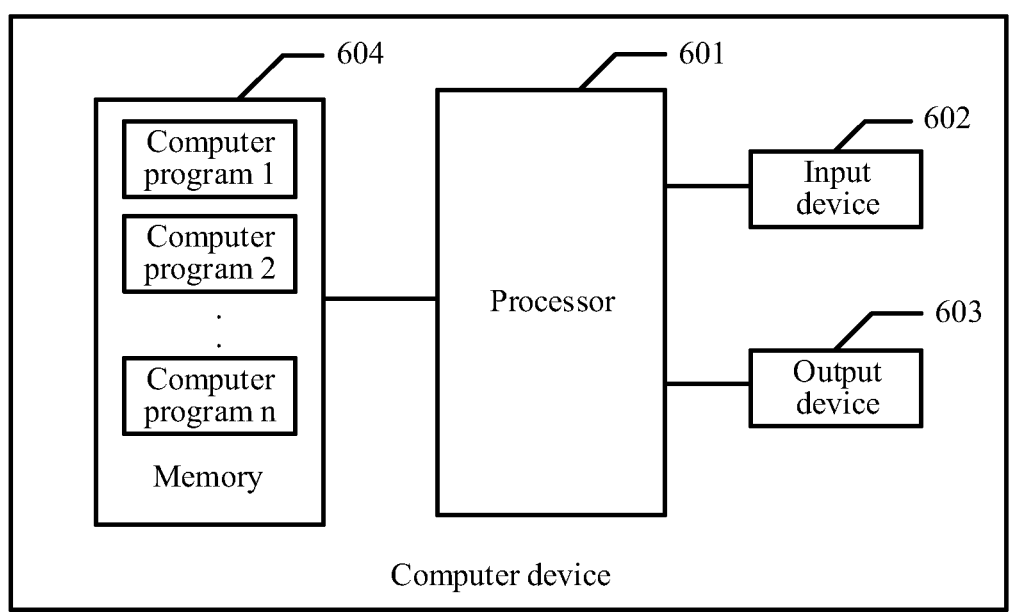
FIG. 6 is a schematic structural diagram of a computer device according to some embodiments.

Based on the foregoing description of some embodiments of a motion estimation method in a coding process, some embodiments further disclose a computer device. Referring to FIG. 6, the computer device may include at least a processor 601, an input device 602, an output device 603, and a memory 604. The processor 601, the input device 602, the output device 603, and the memory 604 in the computer device may be connected by using a bus or in another manner.

The memory 604 is a memory device in the computer device, and is configured to store a program and data. It may be understood that the memory 604 herein may include a built-in storage medium of the computer device, and certainly may also include an extended storage medium supported by the computer device. The memory 604 provides a storage space, and the storage space stores an operating system of the computer device. In addition, a computer program (including program code) is further stored in the storage space. The computer storage medium herein may be a high-speed RAM memory, or may be at least one computer storage medium far from the foregoing processor. The processor may be referred to as a central processing unit (CPU), is a core and a control center of the computer device, and is configured to run the computer program stored in the memory 604.

In some embodiments, the processor 601 may load and execute the computer program stored in the memory 604, so as to implement corresponding operations of the method in the foregoing embodiment of the motion estimation method in a coding process. For example, the processor 601 loads and executes the computer program stored in the memory 604, and is configured to:

obtain a to-be-coded video frame, and determine a to-be-coded target code block from the to-be-coded video frame;

obtain reference motion information of an auxiliary code block of the target code block, the reference motion information of the auxiliary code block including: motion information of N adjacent code blocks adjacent to the target code block and motion information included in a reference code block list, and N being an integer greater than or equal to 1;

determine a target reference picture search range for the target code block from M reference picture lists according to picture search range information indicated by the reference motion information, M being an integer greater than 1; and perform motion estimation on the target code block according to the target reference picture search range.

It is to be understood that in some embodiments, the processor 601 may be a central processing unit (CPU), and the processor 601 may be another general purpose processor, a digital signal processor (DSP), an application specific integrated circuit (ASIC), a field-programmable gate array (FPGA) or another programmable logic device, a discrete gate or transistor logic device, a discrete hardware component, or the like. The general purpose processor may be a microprocessor, or the processor may be any conventional processor.

Some embodiments provide a computer readable storage medium, where the computer readable storage medium stores a computer program, the computer program includes program instructions, and when the program instructions are executed by a processor, the motion estimation method in a coding process provided in the foregoing embodiment may be performed.

Some embodiments further provide a computer program product. The computer program product includes computer instructions. The computer instructions are stored in a computer readable storage medium. When being executed by a processor of a computer device, the computer instructions perform the motion estimation method in a coding process provided in the foregoing embodiment.

A person of ordinary skill in the art is to understand that all or a part of the processes of the method in the foregoing embodiment may be implemented by a program instructing relevant hardware. The program may be stored in a computer readable storage medium. When the program is run, the processes of the method in the foregoing embodiment are performed. The foregoing storage medium may include a magnetic disc, an optical disc, a read-only memory (ROM), a random access memory (RAM), or the like.

The foregoing disclosure is merely an example embodiment of this application, and certainly cannot limit the scope of the rights in this application. A person of ordinary skill in the art may understand all or some procedures for implementing the foregoing embodiments, and equivalent changes made according to the claims of this application still fall within the scope of the present invention.

What is claimed is:

1. A motion estimation method in a coding process, the motion estimation method comprising:
   obtaining a video frame;
   determining a target code block from the video frame;
   obtaining reference motion information of an auxiliary code block of the target code block including motion information of N adjacent code blocks adjacent to the target code block, wherein N is an integer greater than or equal to 1;
   determining a target reference picture search range for the target code block from M reference picture lists based on picture search range information indicated by the reference motion information, wherein M is an integer greater than 1;
   determining a first condition parameter based on the picture search range information, wherein the first condition parameter comprises at least one of a quantity of first-type auxiliary code blocks or an area of a first-type auxiliary code block,
   wherein the first-type auxiliary code block belongs to auxiliary code blocks of the target code block and is a code block that performs a reference picture search on a first reference picture list in the M reference picture lists, the first reference picture list being a forward reference list; and
   performing motion estimation on the target code block based on the target reference picture search range.

2. The method according to claim 1,
   wherein determining the target reference picture search range comprises:
   determining, based on the first condition parameter meeting a first filtering condition, the first reference picture list as the target reference picture search range of the target code block.

3. The method according to claim 2, wherein determining the first reference picture list as the target reference picture search range comprises:
   determining, based on the first condition parameter meeting the first filtering condition, a third condition parameter based on a reference picture corresponding to the reference motion information, wherein the third condition parameter comprises at least one of a quantity of third-type auxiliary code blocks or an area of a third-type auxiliary code block,
   wherein the third-type auxiliary code block belongs to the auxiliary code blocks of the target code block and is a code block that performs a reference picture search on a target reference picture in the first reference picture list; and determining, based on the third condition parameter meeting a third filtering condition, the target reference picture in the first reference picture list as the target reference picture search range of the target code block.

4. The method according to claim 1, wherein determining the target reference picture search range comprises:

determining a second condition parameter based on the picture search range information indicated by the reference motion information, wherein second condition parameter comprises at least one of a quantity of second-type auxiliary code blocks or an area of a second-type auxiliary code block, wherein the second-type auxiliary code block belongs to auxiliary code blocks of the target code block and is a code block that performs a reference picture search on a second reference picture list in the M reference picture lists, the second reference picture list being a backward reference list; and determining, based on the second condition parameter meeting a second filtering condition, the second reference picture list as the target reference picture search range of the target code block.

5. The method according to claim 4, wherein the determining the second condition parameter comprises:

obtaining a first condition parameter and a first filtering condition; and determining, based on the first condition parameter not meeting the first filtering condition, the second condition parameter based on the picture search range information indicated by the reference motion information, wherein the first condition parameter comprises at least one of a quantity of first-type auxiliary code blocks or an area of a first-type auxiliary code block, wherein the first-type auxiliary code block belongs to auxiliary code blocks of the target code block and is a code block that performs a reference picture search on a first reference picture list in the M reference picture lists, the first reference picture list being a forward reference list.

6. The method according to claim 4, wherein determining the second reference picture list as the target reference picture search range comprises:

determining, based on the second condition parameter meeting the second filtering condition, a fourth condition parameter based on a reference picture corresponding to the reference motion information, wherein the fourth condition parameter comprises at least one of a quantity of fourth-type auxiliary code blocks or an area of a fourth-type auxiliary code block, wherein the fourth-type auxiliary code block belongs to the auxiliary code blocks of the target code block and is a code block that performs a reference picture search on a target reference picture in the second reference picture list; and determining, based on the fourth condition parameter meeting a fourth filtering condition, the target reference picture in the second reference picture list as the target reference picture search range of the target code block.

7. The method according to claim 1, wherein determining the target reference picture search range comprises:

determining a fifth condition parameter based on the picture search range information indicated by the reference motion information, wherein the fifth condition parameter comprises at least one of a quantity of fifth-type auxiliary code blocks or an area of a fifth-type auxiliary code block, wherein the fifth-type auxiliary code block belongs to auxiliary code blocks of the target code block and is a code block that performs a reference picture search on reference search pictures in the M reference picture lists; and determining, based on the fifth condition parameter meeting a fifth filtering condition, the reference search pictures as the target reference picture search range of the target code block.

8. The method according to claim 1, wherein before obtaining the reference motion information, the method further comprises:

obtaining feature information of the target code block, the feature information including at least one of a temporal layer at which the video frame is located or both a temporal layer at which the video frame is located and a size of the target code block; and based on the feature information of the target code block meeting a trigger condition, obtaining the reference motion information of the auxiliary code block of the target code block; and based on the feature information of the target code block not meeting a trigger condition, determining at least a first reference picture list and a second reference picture list in the M reference picture lists as the target reference picture search range of the target code block.

9. The method according to claim 1, wherein performing the motion estimation on the target code block comprises:

determining a target reference picture list corresponding to the target reference picture search range and a target reference picture corresponding to the target reference picture list;

obtaining a first motion estimation parameter of the target code block by performing motion estimation based on the target reference picture list and the target reference picture by using a first reference picture search rule;

obtaining a second motion estimation parameter of the target code block by performing motion estimation based on the target reference picture list and the target reference picture by using a second reference picture search rule, wherein the second reference picture search rule is different from the first reference picture search rule; and selecting a target motion estimation parameter of the target code block from the first motion estimation parameter and the second motion estimation parameter.

10. The method according to claim 9, wherein selecting the target motion estimation parameter comprises:

obtaining a first rate distortion corresponding to the first motion estimation parameter and a second rate distortion corresponding to the second motion estimation parameter; and based on the first rate distortion being greater than the second rate distortion, determining the second motion estimation parameter as the target motion estimation parameter; and based on the second rate distortion being greater than the first rate distortion, determining the first motion estimation parameter as the target motion estimation parameter.

11. A motion estimation apparatus, comprising:

at least one memory configured to store computer program code; and at least one processor configured to operate as instructed by the computer program code, the computer program code comprising:
  frame obtaining code configured to cause the at least one processor to obtain a video frame;
  target code block determining code configured to cause the at least one processor to determine a target code block from the video frame;
  motion information code configured to cause the at least one processor to obtain reference motion information of an auxiliary code block of the target code block, including motion information of N adjacent code blocks adjacent to the target code block, wherein N is an integer greater than or equal to 1;
  first search range determining code configured to cause the at least one processor to determine a target reference picture search range for the target code block from M reference picture lists based on picture search range information indicated by the reference motion information, wherein M is an integer greater than 1;
  first parameter determining code configured to cause the at least one processor to determine a first condition parameter based on the picture search range information, wherein the first condition parameter comprises at least one of: a quantity of first-type auxiliary code blocks or an area of a first-type auxiliary code block,
  wherein the first-type auxiliary code block belongs to auxiliary code blocks of the target code block and is a code block that performs a reference picture search on a first reference picture list in the M reference picture lists, the first reference picture list being a forward reference list; and
  motion estimation code configured to cause the at least one processor to perform motion estimation on the target code block according to the target reference picture search range.

12. The motion estimation apparatus according to claim 11,
  wherein the search range determining code further comprises:
  second search range determining code configured to cause the at least one processor to determine, based on the first condition parameter meeting a first filtering condition, the first reference picture list as the target reference picture search range of the target code block.

13. The motion estimation apparatus according to claim 12, wherein the second search range determining code further comprises:
  second parameter determining code configured to cause at least one processor to determine, based on the first condition parameter meeting the first filtering condition, a third condition parameter based on a reference picture corresponding to the reference motion information, wherein the third condition parameter comprises at least one of:
  a quantity of third-type auxiliary code blocks or an area of a third-type auxiliary code block,
  wherein the third-type auxiliary code block belongs to the auxiliary code blocks of the target code block and is a code block that performs reference picture search on a target reference picture in the first reference picture list; and
  third search range determining code configured to cause at the at least one processor to determine that the third condition parameter meets a third filtering condition, the target reference picture in the first reference picture list as the target reference picture search range of the target code block.

14. The motion estimation apparatus according to claim 11, wherein the first search range determining code further comprises:
  condition parameter code configured to cause the at least one processor to determine a second condition parameter based on the picture search range information indicated by the reference motion information, wherein the second condition parameter comprises at least one of:
  a quantity of second-type auxiliary code blocks or an area of a second-type auxiliary code block,
  wherein the second-type auxiliary code block belongs to auxiliary code blocks of the target code block and is a code block that performs reference picture search on a second reference picture list in the M reference picture lists, the second reference picture list being a backward reference list; and
  fourth search range determining code configured to cause the at least one processor to determine, based on the second condition parameter meeting a second filtering condition, the second reference picture list as the target reference picture search range of the target code block.

15. The motion estimation apparatus according to claim 14, wherein the fourth search range determining code is further configured to cause the at least one processor to:
  obtain a first condition parameter and a first filtering condition; and
  determine, based on the first condition parameter not meeting the first filtering condition, the second condition parameter based on the picture search range information indicated by the reference motion information, wherein the first condition parameter comprises at least one of:
  a quantity of first-type auxiliary code blocks and an area of a first-type auxiliary code block,
  wherein the first-type auxiliary code block belongs to auxiliary code blocks of the target code block and is a code block that performs a reference picture search on a first reference picture list in the M reference picture lists, the first reference picture list being a forward reference list.

16. The motion estimation apparatus according to claim 14, wherein the fourth search range determining code is further configured to cause the at least one processor to:
  determine, based on the second condition parameter meeting the second filtering condition, a fourth condition parameter based on a reference picture corresponding to the reference motion information, wherein:
  the fourth condition parameter comprises at least one of:
  a quantity of fourth-type auxiliary code blocks or an area of a fourth-type auxiliary code block,
  wherein the fourth-type auxiliary code block belongs to the auxiliary code blocks of the target code block and is a code block that performs reference picture search on a target reference picture in the second reference picture list; and
  determine, based on the fourth condition parameter meeting a fourth filtering condition, the target reference picture in the second reference picture list as the target reference picture search range of the target code block.

17. The motion estimation apparatus according to claim 11, further comprising picture search range code configured to execute before the motion information code, wherein the picture search range code is configured to cause the at least one processor to:
  obtain feature information of the target code block, the feature information including at least one of a temporal layer at which the video frame is located, or both a temporal layer at which the video frame is located and a size of the target code block; and
  based on the feature information of the target code block meeting a trigger condition, obtain the reference motion information of the auxiliary code block of the target code block; and
  based on the feature information of the target code block not meeting a trigger condition, determine at least a first reference picture list and a second reference picture list in the M reference picture lists as the target reference picture search range of the target code block.

18. The motion estimation apparatus according to claim 11, the motion estimation code is further configured to cause the at least one processor to:
  determine a target reference picture list corresponding to the target reference picture search range and a target reference picture corresponding to the target reference picture list;
  obtain a first motion estimation parameter of the target code block by performing motion estimation based on the target reference picture list and the target reference picture by using a first reference picture search rule; and
  obtain a second motion estimation parameter of the target code block by performing motion estimation based on the target reference picture list and the target reference picture by using a second reference picture search rule, wherein the second reference picture search rule is different from the first reference picture search rule; and wherein the computer program code further comprises
  target motion estimation parameter selection code configured cause the at least one processor to select a target motion estimation parameter of the target code block from the first motion estimation parameter and the second motion estimation parameter.

19. The motion estimation apparatus according to claim 18, wherein the target motion estimation parameter selection code is further configured to cause the at least one processor to:
  obtain first rate distortion corresponding to the first motion estimation parameter and second rate distortion corresponding to the second motion estimation parameter; and
  based on the first rate distortion being greater than the second rate distortion, determine the second motion estimation parameter as the target motion estimation parameter; and
  based on the second rate distortion being greater than the first rate distortion, determine the first motion estimation parameter as the target motion estimation parameter.

20. A non-transitory computer readable medium having stored thereon a computer program for motion estimation, the computer program configured to cause one or more computer processors to:
  obtain a video frame;
  determine a target code block from the video frame;
  obtain reference motion information of an auxiliary code block of the target code block, including: motion information of N adjacent code blocks adjacent to the target code block, wherein N is an integer greater than or equal to 1;
  determine a target reference picture search range for the target code block from M reference picture lists based on picture search range information indicated by the reference motion information, wherein M is an integer greater than 1;
  determine a first condition parameter based on the picture search range information, wherein the first condition parameter comprises at least one of a quantity of first-type auxiliary code blocks or an area of a first-type auxiliary code block,
  wherein the first-type auxiliary code block belongs to auxiliary code blocks of the target code block and is a code block that performs a reference picture search on a first reference picture list in the M reference picture lists, the first reference picture list being a forward reference list; and
  perform motion estimation on the target code block based on the target reference picture search range.

* * * * *